United States Patent
Tsuchitani et al.

(10) Patent No.: US 12,352,028 B2
(45) Date of Patent: Jul. 8, 2025

(54) FLUSH TOILET APPARATUS

(71) Applicant: TOTO LTD., Kitakyushu (JP)

(72) Inventors: Takumi Tsuchitani, Kitakyushu (JP);
Kenichi Nakamura, Kitakyushu (JP);
Hiroshi Hashimoto, Kitakyushu (JP);
Shinichi Urata, Kitakyushu (JP);
Chisato Sone, Kitakyushu (JP);
Koichiro Matsumura, Kitakyushu (JP)

(73) Assignee: TOTO LTD., Kitakyushu (JP)

( * ) Notice: Subject to any disclaimer, the term of this patent is extended or adjusted under 35 U.S.C. 154(b) by 218 days.

(21) Appl. No.: 18/121,705

(22) Filed: Mar. 15, 2023

(65) Prior Publication Data

US 2023/0313513 A1  Oct. 5, 2023

(30) Foreign Application Priority Data

Mar. 31, 2022 (JP) .................. 2022-059286

(51) Int. Cl.
*E03D 1/26* (2006.01)
*E03D 1/33* (2006.01)
*E03D 1/34* (2006.01)

(52) U.S. Cl.
CPC .............. *E03D 1/263* (2013.01); *E03D 1/34* (2013.01); *E03D 1/33* (2013.01)

(58) Field of Classification Search
CPC .. E03D 1/263; E03D 1/34; E03D 1/33; E03D 1/14; E03D 1/26; E03D 11/02; E03D 1/302; E03D 1/304; E03D 1/32; E03D 1/35; E03D 1/36; E03D 1/38; E03D 5/10; E03D 11/13; E03D 11/17; E03D 11/18; Y02A 20/40

USPC .................................................... 4/421, 422
See application file for complete search history.

(56) References Cited

U.S. PATENT DOCUMENTS

| | | | | |
|---|---|---|---|---|
| 6,823,535 | B2* | 11/2004 | Tomita ...................... | E03D 3/04 4/421 |
| 6,986,172 | B2* | 1/2006 | Hidetaka ................. | E03D 11/08 4/421 |
| 12,111,296 | B2* | 10/2024 | Fujito ..................... | G01N 30/88 |
| 2013/0212794 | A1* | 8/2013 | Yamasaki ............... | F16K 31/34 4/392 |

(Continued)

FOREIGN PATENT DOCUMENTS

| | | | | |
|---|---|---|---|---|
| EP | 1273725 A1 * | 1/2003 | .............. | E03D 5/00 |
| JP | 2016-031008 A | 3/2016 | | |
| JP | 2020105821 A * | 7/2020 | | |

(Continued)

*Primary Examiner* — Lori L Baker
(74) *Attorney, Agent, or Firm* — IceMiller LLP

(57) ABSTRACT

Provided is a flush toilet apparatus having a flush toilet main body that includes a bowl, a water discharge trap pipe, an upper water discharge port, a lower water discharge port, and a flush control device configured to execute both a large flush mode and a small flush mode. When in operation, the flush control device causes flush water to be discharged from the lower water discharge port with substantially the same amount in each of the large flush mode and the small flush mode to induce a siphon phenomenon in the water discharge trap pipe. The device also controls water discharge from the upper water discharge port so that a water level of pooled water in the bowl during the water discharge from the lower water discharge port is changed between the large flush mode and the small flush mode.

8 Claims, 6 Drawing Sheets

(56) References Cited

U.S. PATENT DOCUMENTS

2024/0401318 A1* 12/2024 Zhao ................... E03D 1/286

FOREIGN PATENT DOCUMENTS

| JP | 7345740 B1 * | 9/2023 | ............. E03D 1/263 |
| WO | WO-0132996 A1 * | 5/2001 | ............. E03D 11/02 |
| WO | WO-2016031008 A1 * | 3/2016 | ............. B01D 15/40 |

* cited by examiner

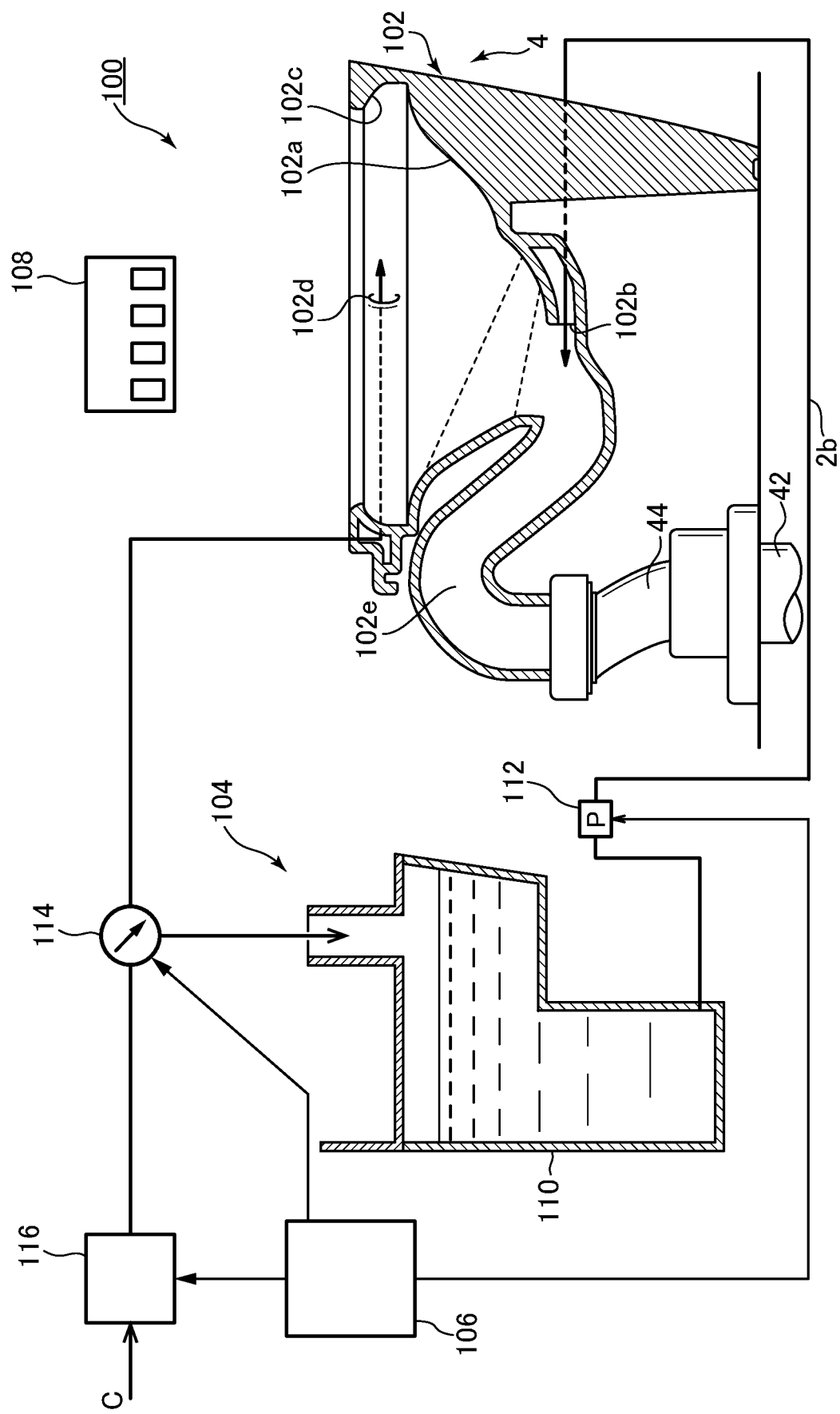

FLUSH TOILET APPARATUS

BACKGROUND OF THE INVENTION

Field of the Invention

The present invention relates to a flush toilet apparatus, and more particularly, to a flush toilet apparatus capable of executing a large flush mode and a small flush mode.

Description of the Related Art

A discharge valve device is disclosed in Japanese Patent Laid-Open No. 2020-105821. The discharge valve device is disposed in a reservoir tank of a flush toilet and is configured to discharge flush water in the reservoir tank in response to a user's operation. That is, the discharge valve device is configured to, when a user presses a large flush button, execute large flush, and to, when the user presses a small flush button, execute small flush in which flush water amount smaller than the flush water amount in the large flush is discharged from the reservoir tank.

A flush toilet is disclosed in Japanese Patent Laid-Open No. 2016-31008. The flush toilet includes a toilet main body, and a water supply function unit that supplies flush water to the toilet main body. The water supply function unit includes a reservoir tank and a pump and is configured so that the flush water stored in the reservoir tank is pressurized by the pump and is discharged from a jet spout port of the toilet main body. On the other hand, a water supply source is directly connected to a rim spout port of the toilet main body so that the water supply pressure of the water supply source is used to discharge the flush water from the rim spout port.

The discharge valve device disclosed in Japanese Patent Laid-Open No. 2020-105821, however, has a problem in that the discharge valve device configured to execute the large flush mode (a large flush) and the small flush mode (a small flush) becomes complex. In the discharge valve device disclosed in Japanese Patent Laid-Open No. 2020-105821, the flushing operation by the user is transmitted to the discharge valve via a mechanism including a plurality of links. That is, the discharge valve device is configured so that the rotation angles of the links are changed between when the large flush button is pressed by the user and when the small flush button is pressed by the user, to change a pull-up amount of the discharge valve, which makes it possible to achieve execution of the large flush mode and the small flush mode. Therefore, the discharge valve device disclosed in Japanese Patent Laid-Open No. 2020-105821 has a problem in that a complex mechanism is necessary to achieve the execution of the large flush mode and the small flush mode. Since the mechanism of the discharge valve device becomes complex, the discharge valve device also has a problem in that it is difficult to ensure the operational reliability over a long period of time.

On the other hand, the flush toilet disclosed in Japanese Patent Laid-Open No. 2016-31008 is a toilet that washes a bowl with the flush water stored in the reservoir tank and the flush water directly supplied from the water supply source but does not correspond to the two flush modes of a large flush and a small flush. If the flush water amount from the water supply source is changed simply to achieve execution of the two flush modes different in flush water amount, a problem occurs in that the flush power is insufficient, or waste water is generated.

Accordingly, an object of the present invention is to provide a flush toilet apparatus capable of executing a large flush mode and a small flush mode with a simple configuration and reducing generation of waste water.

SUMMARY OF THE INVENTION

To solve the above problems, the present invention is a flush toilet apparatus capable of executing a large flush mode and a small flush mode, the flush toilet apparatus comprising a flush toilet main body that includes a bowl, a water discharge trap pipe communicating with a lower portion of the bowl, an upper water discharge port provided above a pooled water surface of the bowl, and a lower water discharge port provided below the pooled water surface, and a flush control device configured to control water discharge of the flush water from the upper water discharge port and the lower water discharge port to execute the large flush mode and the small flush mode in which a flush water amount is smaller than the flush water amount in the large flush mode, wherein the flush control device causes the flush water to be discharged from the lower water discharge port with substantially the same amount in each of the large flush mode and the small flush mode to induce a siphon phenomenon in a water discharge trap pipe, while controlling the water discharge from the upper water discharge port so that a water level of pooled water in the bowl during the water discharge from the lower water discharge port is different between the large flush mode and the small flush mode.

In the present invention configured as described above, the flush control device controls the water discharge of the flush water from the upper water discharge port above the pooled water surface of the bowl and the lower water discharge port below the pooled water surface to thereby execute the large flush mode and the small flush mode. Furthermore, the flush control device causes the flush water to be discharged from the lower water discharge port with substantially the same amount in each of the large flush mode and the small flush mode to induce the siphon phenomenon in the water discharge trap pipe, while controlling the water discharge from the upper water discharge port so that a water level of the pooled water in the bowl during the water discharge from the lower water discharge port is changed between the large flush mode and the small flush mode.

According to the present invention configured as described above, the flush control device causes the flush water to be discharged from the lower water discharge port with substantially the same amount in each of the large flush mode and the small flush mode to induce the siphon phenomenon in the water discharge trap pipe, which makes it possible to achieve the execution of the large flush mode and the small flush mode with a simple configuration. According to the present invention configured as described above, the flush control device controls the water discharge from the upper water discharge port so that the water level of the pooled water in the bowl during the water discharge from the lower water discharge port is changed between the large flush mode and the small flush mode, which makes it possible to achieve the execution of the large flush mode and the small flush mode while reducing waste water.

In the present invention, the flush control device preferably increases a flow rate or time of the water discharge from the upper water discharge port until the water discharge from the lower water discharge port is started in execution of the large flush mode more than in the execution of the small flush mode, whereby the water level of the pooled water in the bowl when the water discharge from the lower water discharge port is started is set to be higher in the large flush mode than in the small flush mode.

According to the present invention configured as described above, the water level of the pooled water in the bowl when the water discharge from the lower water discharge port is started is set to be higher in the large flush mode than in the small flush mode. Therefore, in the large flush mode, the water discharge from the lower water discharge port makes it possible to feed more flush water into the water discharge trap pipe, to induce the high siphon phenomenon even when an amount of the water discharge from the lower water discharge port is substantially the same as the amount in the small flush mode, and to increase the flush power.

In the present invention, the flush control device preferably causes the water discharge from the lower water discharge port to be started before the siphon phenomenon occurs in the water discharge trap pipe.

In the present invention configured as described above, since the water discharge from the lower water discharge port is started before the siphon phenomenon occurs in the water discharge trap pipe, the water discharge from the lower water discharge port can be used to induce the siphon phenomenon. Therefore, a large amount of flush water is discharged from the upper water discharge port before the siphon phenomenon occurs, which makes it possible to reduce generation of waste water.

In the present invention, the flush control device preferably causes the water discharge from the lower water discharge port to be started before the water level of the pooled water in the bowl reaches a stable water level at which a flow rate of the flush water flowing out over the water discharge trap pipe is equal to a flow rate of the flush water flowing into the bowl from the upper water discharge port.

When the flush water flows into the bowl from the upper water discharge port, the water level in the bowl rises, and the flush water in the bowl flows out over the water discharge trap pipe. The flow rate of the flush water flowing out over the water discharge trap pipe increases gradually, and then becomes equal to the flow rate of the flush water flowing into the bowl from the upper water discharge port, and in this state, the water level in the bowl reaches the stable water level. According to the present invention configured as described above, the water discharge from the lower water discharge port is started before the water level in the bowl reaches the stable water level, which makes it possible to reduce the amount of the flush water drained from the bowl without significantly contributing to the drainage of the waste and to reduce the waste water.

In the present invention, the flush control device preferably decreases a flow rate or time of the water discharge from the upper water discharge port after the water discharge from the lower water discharge port is started in execution of the small flush mode more than in the execution of the large flush mode, whereby the water level of the pooled water in the bowl after the water discharge from the lower water discharge port is started is set to be higher in the large flush mode than in the small flush mode.

In general, when the flush water flows into the bowl in the state in which the siphon phenomenon is occurring in the water discharge trap pipe, the water level in the bowl rises, and therefore, the air hardly enters the water discharge trap pipe, and the duration of the siphon phenomenon is increased. According to the present invention configured as described above, the water level of the pooled water in the bowl after the water discharge from the lower water discharge port is started is set to be higher in the large flush mode than in the small flush mode. As a result, in the large flush mode in which the water level of the pooled water is higher than in the small flush mode, the duration of the siphon phenomenon is longer than in the small flush mode. Therefore, the duration of the siphon phenomenon can be set to be longer in the large flush mode than in the small flush mode while the flush water is discharged from the lower water discharge port with substantially the same amount in each of the large flush mode and the small flush mode, whereby the flush power can be increased.

In the present invention, the flush control device preferably controls the water discharge from the upper water discharge port so that at least in the execution of the large flush mode, the water level of the pooled water in the bowl is higher than an upper end of an inlet of the water discharge trap pipe before the water discharge from the lower water discharge port is started.

According to the present invention configured as described above, the water is discharged from the upper water discharge port so that the water level of the pooled water is higher than the upper end of the inlet of the water discharge trap pipe before the water discharge from the lower water discharge port is started, and therefore, the water discharge from the lower water discharge port can be used to induce the siphon phenomenon and the duration of the siphon phenomenon can be increased while reducing the amount of flush water.

In the present invention, the flush control device preferably causes the water discharge from the upper water discharge port to be continued from before the water discharge from the lower water discharge port for inducing the siphon phenomenon is started until the water discharge from the lower water discharge port is terminated, in the execution of the large flush mode.

According to the present invention configured as described above, the water discharge from the upper water discharge port is continued from before the water discharge for inducing the siphon phenomenon is started until the water discharge is terminated. Therefore, the water discharge from the upper water discharge port can be used to wash the surface of the bowl, assist the siphon effect induced by the water discharge from the lower water discharge port, and refill the bowl, whereby the water discharge from the upper water discharge port can be effectively utilized for the flush.

In the present invention, the flush toilet apparatus preferably further includes a flush water tank main body configured to store flush water, a discharge valve configured to switch drainage and stop of the flush water in the flush water tank main body, and an on-off valve configured to switch discharge and stop of flush water supplied from a water supply source, and the flush control device causes the flush water to be discharged from the lower water discharge port by opening the discharge valve, and causes the flush water to be discharged from the upper water discharge port by opening the on-off valve.

In the present invention configured as described above, the flush control device causes the flush water in the flush water tank main body to be discharged from the lower water discharge port by opening the discharge valve, and causes the flush water supplied from the water supply source to be discharged from the upper water discharge port by opening the on-off valve. According to the present invention configured as described above, the flush water is discharged from the lower water discharge port with substantially the same amount in each of the large flush mode and the small flush mode, which makes it possible to simplify the mechanism for opening the discharge valve. On the other hand, the water discharge timing, flow rate, and the like of the flush water supplied from the water supply source can be changed relatively easily by the control of the on-off valve, and the execution of the large flush mode and the small flush mode can be achieved easily.

According to the present invention, the flush toilet apparatus can execute a large flush mode and a small flush mode with a simple configuration and reduce generation of waste water.

BRIEF DESCRIPTION OF THE DRAWINGS

FIG. 8 is a diagram illustrating an entire configuration of a flush toilet apparatus according to a third embodiment of the present invention.

DETAILED DESCRIPTION OF THE PREFERRED EMBODIMENTS

Figure 1:
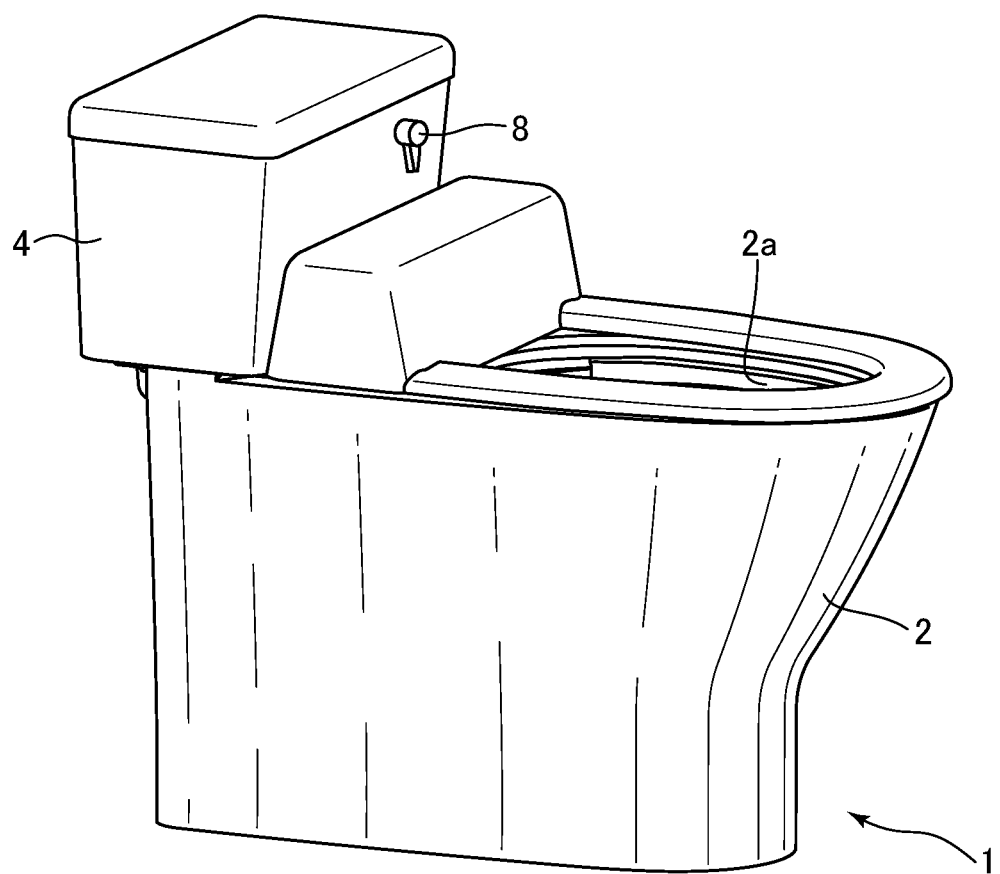
FIG. 1 is a perspective view illustrating an entire flush toilet apparatus according to a first embodiment of the present invention.
Figure 2:
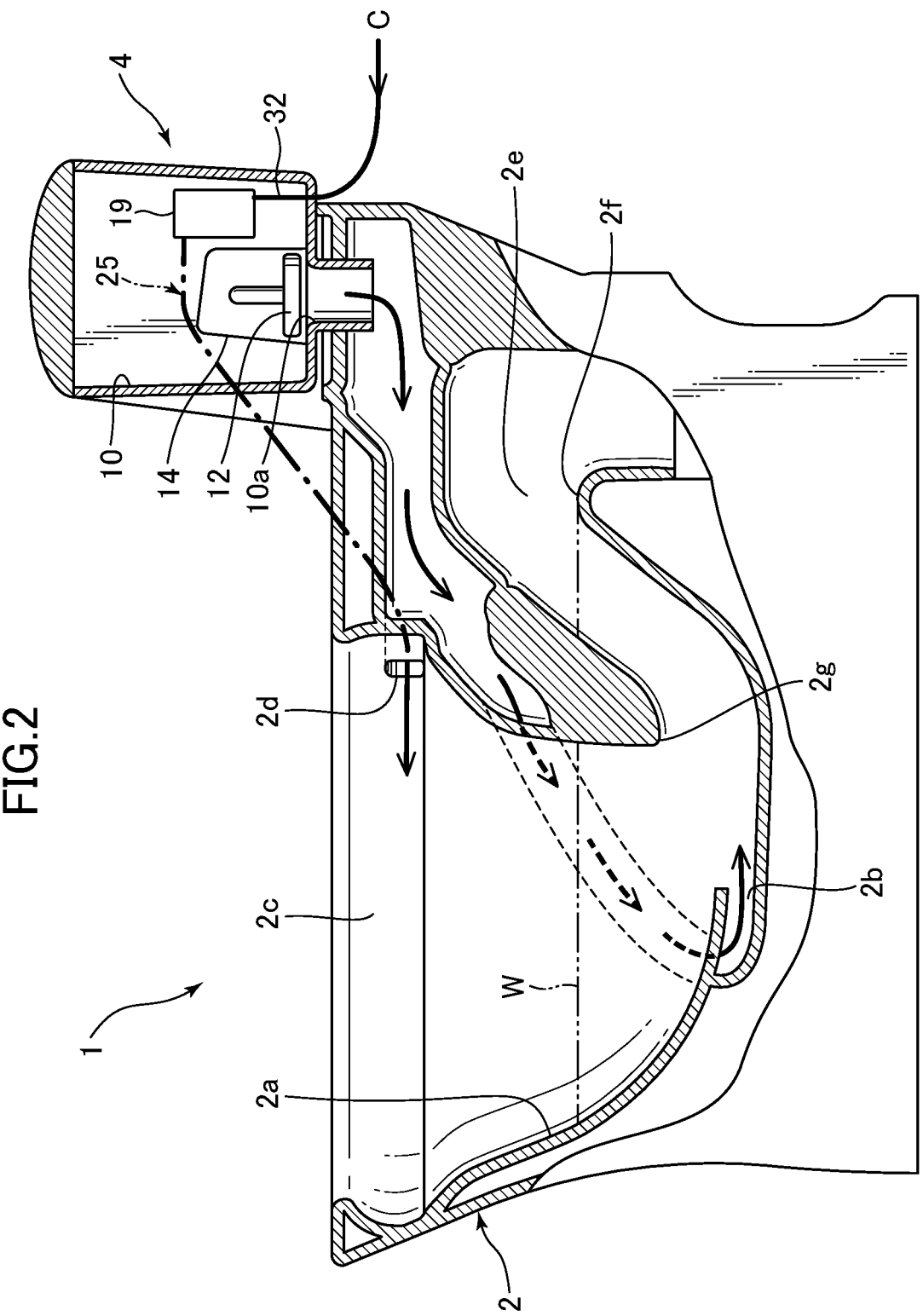
FIG. 2 is a full cross-sectional view of the flush toilet apparatus according to the first embodiment of the present invention.
Figure 3:
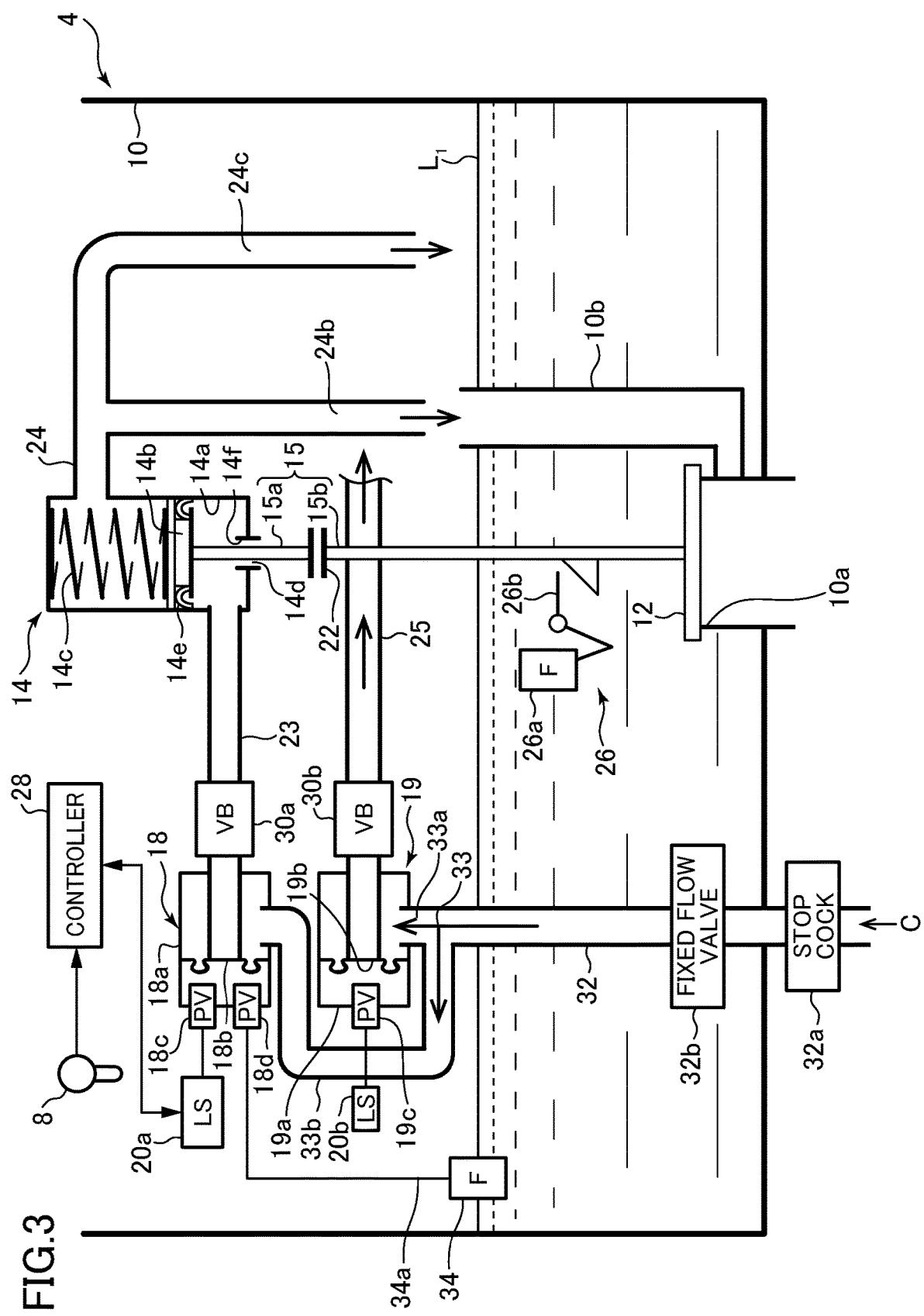
FIG. 3 is a cross-sectional view illustrating a schematic configuration of a flush water tank device included in the flush toilet apparatus according to the first embodiment of the present invention.

Next, a flush toilet apparatus according to embodiments of the present invention will be described with reference to the accompanying drawings. FIG. 1 is a perspective view illustrating an entire flush toilet apparatus according to a first embodiment of the present invention. FIG. 2 is a full cross-sectional view of the flush toilet apparatus according to the first embodiment of the present invention. FIG. 3 is a cross-sectional view illustrating a schematic configuration of a flush water tank device included in the flush toilet apparatus according to the first embodiment of the present invention.

As illustrated in FIGS. 1 and 2, a flush toilet apparatus 1 according to the first embodiment of the present invention includes a flush toilet main body 2 and a flush water tank device 4 mounted at a rear portion of the flush toilet main body 2. The flush toilet apparatus 1 of the present embodiment is configured to be capable of executing a large flush or a small flush on a bowl 2a of the flush toilet main body 2 in response to operation of a lever handle 8 provided on the flush water tank device 4 after use of the flush toilet apparatus 1. The flush water tank device 4 provided in the present embodiment is configured to supply to the flush toilet main body 2, flush water stored in the flush water tank device 4 and flush water supplied from a waterworks C, which is a water supply source, in response to the operation of the lever handle 8 and wash the bowl 2a with the supplied flush water.

As a modified example, the present invention can be also constituted so that washing of the bowl 2a is performed by operation of a remote control device (not illustrated) attached to a wall surface. Alternatively, the present invention can be also constituted so that the washing of the bowl 2a is performed after an elapse of a predetermined time period after a human sensor (not illustrated) provided in a toilet seat detects that a user has stood from the toilet seat. In this case, the human sensor (not illustrated) may be provided in the toilet seat or at any position where user's motions of sitting on, standing from, approach to and departure from the toilet seat, and holding his/her hand over the sensor can be detected, and, therefore, may be provided in the flush toilet main body 2 or the flush water tank device 4, for example. The human sensor (not illustrated) may be any sensor capable of detecting the user's motions of sitting on, standing from, approach to and departure from the toilet seat, and holding his/her hand over the sensor, and therefore, for example, an infrared sensor or a microwave sensor may be used as the human sensor.

Next, as illustrated in FIG. 2, the flush water tank device 4 includes a reservoir tank 10, which is a flush water tank main body configured to store flush water to be supplied to the flush toilet main body 2, a discharge valve 12 for opening and closing a discharge port 10a provided in the reservoir tank 10, and a discharge valve hydraulic drive part 14, which is a hydraulic drive mechanism configured to drive the discharge valve 12. Furthermore, the flush water tank device 4 includes a water spout control valve 19, which is an on-off valve configured to directly supply, to the flush toilet main body 2, the flush water supplied from the waterworks C.

Here, the flush water tank device 4 is configured so that the flush water stored in the reservoir tank 10 and flowing out of the reservoir tank 10 when the discharge valve 12 is opened is discharged, during a toilet flush, from a jet spout port 2b, which is a lower water discharge port provided below a pooled water surface W of the bowl 2a of the flush toilet main body 2. In addition, the flush water tank device 4 is configured so that the flush water supplied from the waterworks C via the water spout control valve 19 is discharged, during a toilet flush, from a rim spout port 2d, which is an upper water discharge port provided in a rim 2c of the bowl 2a and above the pooled water surface W of the bowl 2a. Furthermore, a water discharge trap pipe 2e communicates with a lower portion of the bowl 2a, and an inlet of the water discharge trap pipe 2e is directed to face the jet spout port 2b. Therefore, in the present embodiment, when water is discharged from the jet spout port 2b, the water discharge trap pipe 2e is filled with the water, and the siphon phenomenon is induced.

Next, a configuration of the flush water tank device 4 included in the flush toilet apparatus 1 according to the first embodiment of the present invention will be described with reference to FIG. 3. FIG. 3 is a cross-sectional view illustrating a schematic configuration of the flush water tank device included in the flush toilet apparatus 1 according to the first embodiment of the present invention.

As illustrated in FIG. 3, the flush water tank device 4 included in the flush toilet apparatus of the present embodiment includes the reservoir tank 10, the discharge valve 12 configured to open and close the discharge port 10a of the reservoir tank 10, and the discharge valve hydraulic drive part 14, which is the hydraulic drive mechanism configured to drive the discharge valve 12. Furthermore, the flush water tank device 4 includes the water spout control valve 19, which is the on-off valve configured to control discharge and stop of the flush water from the rim spout port 2d (FIG. 2), a water discharge control valve 18 configured to supply the flush water to the discharge valve hydraulic drive part 14, and a controller 28 configured to control these control valves. In the present embodiment, the discharge valve hydraulic drive part 14 and the controller 28 function as a flush control device, and the flush control device controls discharge of the flush water from the rim spout port 2d and the jet spout port 2b to execute the large flush mode and the small flush mode in which the flush water amount is smaller than the flush water amount in the large flush mode.

The reservoir tank 10 is a tank configured to store the flush water to be supplied to the jet spout port 2b (FIG. 2) of the flush toilet main body 2, and the discharge port 10a for discharging the stored flush water into the flush toilet main body 2 is formed in a bottom portion of the reservoir tank 10. In the reservoir tank 10, an overflow pipe 10b is connected to a downstream side of the discharge port 10a. The overflow pipe 10b rises vertically from the vicinity of the discharge port 10a and extends above a stopped water level $L_1$ of the flush water stored in the reservoir tank 10. Accordingly, the flush water that has flowed into the overflow pipe 10b from an upper end thereof bypasses the discharge port 10a to directly flow out of the jet spout port 2b of the flush toilet main body 2.

The discharge valve 12 is a valve body placed to open and close the discharge port 10a and is opened when the discharge valve 12 is pulled up upward, whereby the flush water in the reservoir tank 10 is drained into the flush toilet main body 2 and is discharged from the jet spout port 2b provided in the lower portion of the bowl 2a (FIG. 2).

On the other hand, the flush water supplied from the waterworks C to a water supply pipe 32 flows into a water supply pipe branching portion 33 via a stop cock 32a and a fixed flow valve 32b. The water supply pipe branching portion 33 splits the flush water supplied from the waterworks C into a first branched pipe 33a and a second branched pipe 33b. Furthermore, the water spout control valve 19 is provided in the first branched pipe 33a, and the water discharge control valve 18 is provided in the second branched pipe 33b. Note that the stop cock 32a is placed outside the reservoir tank 10, and, on the downstream side thereof, is connected to the fixed flow valve 32b in the reservoir tank 10, and the water supply pipe branching portion 33 is provided on the downstream side of the fixed flow valve 32b.

The stop cock 32a is provided to stop the water supply to the flush water tank device 4 at the time of maintenance or the like and is normally used in an open state. The fixed flow valve 32b is provided to cause the water supplied from the waterworks C to flow into the water supply pipe branching portion 33 at a predetermined flow rate and is configured to supply the water to the flush water tank device 4 at a constant flow rate regardless of a placement environment of the flush toilet apparatus.

On the other hand, the water spout control valve 19 provided in the first branched pipe 33a is configured to cause the water supplied from the first branched pipe 33a to flow out to a rim water supply pipe 25. The rim water supply pipe 25 communicates with the rim spout port 2d (FIG. 2) of the flush toilet main body 2 (not illustrated in FIG. 3), so that the flush water that has flowed into the rim water supply pipe 25 is discharged, as rim flush water for washing the bowl, from the rim spout port 2d. A vacuum breaker 30b is provided in the middle of the rim water supply pipe 25. This can prevent the water from flowing backward from a side of the flush toilet main body to the water spout control valve 19 when the water spout control valve 19 side is brought into a negative pressure.

The water spout control valve 19 includes a water spout valve main body 19a, a main valve body 19b placed in the water spout valve main body 19a, and an electromagnetic valve pilot valve 19c. An electromagnetic valve 20b for water spout control is connected to the water spout control valve 19 so that the electromagnetic valve pilot valve 19c is moved by the electromagnetic valve 20b for water spout control. That is, the electromagnetic valve pilot valve 19c is configured to open and close a pilot valve port (not illustrated) provided in the water spout valve main body 19a. When the pilot valve port (not illustrated) is opened, the pressure inside a pressure chamber provided in the water spout valve main body 19a decreases, and the main valve body 19b of the water spout control valve 19 is opened. In addition, when the pilot valve port (not illustrated) is closed, the pressure inside the pressure chamber increases, and the main valve body 19b is closed. Accordingly, the main valve body 19b of the water spout control valve 19 is opened and closed in response to the operation of the electromagnetic valve 20b for water spout control to thereby control supply and stop of the water to the rim spout port 2d (FIG. 2).

Next, the water discharge control valve 18 provided in the second branched pipe 33b is configured to cause the water supplied from the second branched pipe 33b to flow out to the discharge valve hydraulic drive part 14. The water discharge control valve 18 includes a control valve main body 18a, a main valve body 18b placed in the control valve main body 18a, an electromagnetic valve pilot valve 18c, and a float pilot valve 18d. Furthermore, an electromagnetic valve 20a for water discharge control and a control valve float 34 are connected to the water discharge control valve 18.

The electromagnetic valve 20a for water discharge control is configured to move the electromagnetic valve pilot valve 18c incorporated in the water discharge control valve 18 to open and close a pilot valve port (not illustrated) on the basis of a signal transmitted from the controller 28. When the pilot valve port (not illustrated) is opened, the pressure inside a pressure chamber provided in the control valve main body 18a decreases, and the main valve body 18b of the water discharge control valve 18 is opened. In addition, when the pilot valve port (not illustrated) is closed, the pressure inside the pressure chamber increases, and the main valve body 18b is closed. Accordingly, the main valve body 18b of the water discharge control valve 18 is opened and closed in response to the operation of the electromagnetic valve 20a for water discharge control to thereby control supply and stop of the water to the discharge valve hydraulic drive part 14. Note that in the present embodiment, as the electromagnetic valve 20a for water discharge control, there is used a bistable latching solenoid that moves the electromagnetic valve pilot valve 18c when the energization is performed once and maintains this state even when the energization is stopped. This type of electromagnetic valve can return the electromagnetic valve pilot valve 18c to an original position when the energization is performed again in the opposite direction.

Furthermore, a control valve float 34 is also connected to the water discharge control valve 18 so that the float pilot valve 18*d* is moved in response to the movement of the control valve float 34. That is, the control valve float 34 is placed in the reservoir tank 10 and rises with the rise of the water level in the reservoir tank 10, whereby the float pilot valve 18*d* is moved via an arm portion 34*a*. When the water level in the reservoir tank 10 rises to the stopped water level $L_1$, the float pilot valve 18*d* closes the pilot valve port (not illustrated) of the control valve main body 18*a*.

In this way, the float pilot valve 18*d* is configured to control the pressure inside the pressure chamber provided in the control valve main body 18*a* by opening and closing the pilot valve port (not illustrated). As a result, when both of the pilot valve port (not illustrated) to be opened and closed by the float pilot valve 18*d* and the pilot valve port (not illustrated) to be opened and closed by the electromagnetic valve pilot valve 18*c* are closed, the pressure inside the pressure chamber in the control valve main body 18*a* increases, and the main valve body 18*b* is closed.

Note that, in a standby state of the flush water tank device 4, the water level in the reservoir tank 10 is the stopped water level $L_1$, and in this state, the pilot valve port (not illustrated) to be opened and closed by the float pilot valve 18*d* is closed. Accordingly, in the standby state, the electromagnetic valve pilot valve 18*c* is moved in response to the operation of the electromagnetic valve 20*a* for water discharge control, whereby the pilot valve port (not illustrated) is opened, which can cause the main valve body 18*b* of the water discharge control valve 18 to be opened.

Specifically, the controller 28 receives a signal from the lever handle 8 and transmits an electric signal to the electromagnetic valve 20*a* for water discharge control, to actuate the electromagnetic valve 20*a* for water discharge control, which causes the water discharge control valve 18 to be opened. The water discharge control valve 18 controls supply and stop of the supplied flush water to the discharge valve hydraulic drive part 14 on the basis of an instruction signal from the controller 28. In the present embodiment, the total amount of the flush water that has flowed out of the water discharge control valve 18 is supplied to the discharge valve hydraulic drive part 14 through an inflow pipe 23.

A vacuum breaker 30*a* is provided in the inflow pipe 23 that connects the water discharge control valve 18 and the discharge valve hydraulic drive part 14. If the water discharge control valve 18 side is brought into a negative pressure by this vacuum breaker 30*a*, outside air is drawn into the inflow pipe 23, which can prevent the water from flowing backward from the discharge valve hydraulic drive part 14 side.

Next, the discharge valve hydraulic drive part 14 is configured to drive the discharge valve 12 using the water supply pressure of the flush water supplied from the waterworks C. Specifically, the discharge valve hydraulic drive part 14 includes a cylinder 14*a* into which the water supplied from the water discharge control valve 18 flows, a piston 14*b* slidably placed in the cylinder 14*a*, and a rod 15 that protrudes from a lower end of the cylinder 14*a* to drive the discharge valve 12. Furthermore, a spring 14*c* is placed inside the cylinder 14*a*, and urges the piston 14*b* downward, and a packing 14*e* is attached to the piston 14*b*, whereby the watertightness is achieved between an inner wall surface of the cylinder 14*a* and the piston 14*b*.

The cylinder 14*a* is a cylindrical member that is placed so that an axis thereof is oriented in the vertical direction, and slidably accommodates the piston 14*b* therein. The inflow pipe 23 is connected to a lower end portion of the cylinder 14*a* so that the water that has flowed out of the water discharge control valve 18 flows into the cylinder 14*a*. Therefore, the piston 14*b* in the cylinder 14*a* is pushed up against the urging force of the spring 14*c* by the water that has flowed into the cylinder 14*a*.

On the other hand, an outflow hole is provided in an upper end portion of the cylinder 14*a*, and an outflow pipe 24 communicates with the interior of the cylinder 14*a* via the outflow hole. Accordingly, when the water flows into the cylinder 14*a* from the inflow pipe 23 connected to the lower portion of the cylinder 14*a*, the piston 14*b* is pushed up upward from the lower portion of the cylinder 14*a*. Then, when the piston 14*b* is pushed up above the outflow hole, the water that has flowed into the cylinder 14*a* flows out of the outflow hole through the outflow pipe 24. That is, the inflow pipe 23 and the outflow pipe 24 communicate with each other via the interior of the cylinder 14*a* when the piston 14*b* is moved upward.

The outflow pipe 24 is split into two pipes in the middle, and a first descending pipe 24*b* branching downward opens downward above the overflow pipe 10*b*. The other second descending pipe 24*c* extends substantially horizontally, and then is curved downward so as to cause the water to flow out into the reservoir tank 10. Accordingly, a part of the flush water that has flowed out of the cylinder 14*a* flows into the overflow pipe 10*b*, and the remainder of the flush water is stored in the reservoir tank 10.

The rod 15 is a rod-shaped member connected to a lower surface of the piston 14*b* and extends to protrude downward from the inside of the cylinder 14*a* through a through hole 14*f* formed in a bottom surface of the cylinder 14*a*. The discharge valve 12 is connected to a lower end of the rod 15, and the rod 15 connects the piston 14*b* and the discharge valve 12. Therefore, when the water flows into the cylinder 14*a* and the piston 14*b* is pushed up, the rod 15 connected to the piston 14*b* lifts the discharge valve 12 upward, whereby the discharge valve 12 is opened.

A gap 14*d* is provided between the rod 15 protruding from below the cylinder 14*a* and an inner wall of the through hole 14*f* in the cylinder 14*a*, whereby a part of the water that has flowed into the cylinder 14*a* flows out of the gap 14*d*. The water that has flowed out of the gap 14*d* flows into the reservoir tank 10. Note that, since the gap 14*d* is relatively narrow and has a large flow path resistance, the pressure inside the cylinder 14*a* is increased by the water flowing from the inflow pipe 23 into the cylinder 14*a* even in the state in which the water flows out of the gap 14*d*, whereby the piston 14*b* is pushed up against the urging force of the spring 14*c*.

Furthermore, a clutch mechanism 22 is provided in the middle of the rod 15. The clutch mechanism 22 is configured to separate the rod 15 into an upper rod 15*a* and a lower rod 15*b* when the discharge valve 12 is lifted up by a predetermined distance together with the rod 15. In a state in which the clutch mechanism 22 is disengaged, the lower rod 15*b* ceases to move in association with the movement of the upper portion including the piston 14*b* and the upper rod 15*a* and falls by gravity together with the discharge valve 12 while resisting buoyancy.

In addition, a discharge valve float mechanism 26 is provided in the vicinity of the discharge valve 12. The discharge valve float mechanism 26 is configured to delay closing of the discharge port 10*a* by causing the lower rod 15*b* and the discharge valve 12 to fall after the rod 15 is lifted up by a predetermined distance and the lower rod 15*b* is separated by the clutch mechanism 22. Specifically, the discharge valve float mechanism 26 includes a float portion 26a and an engaging portion 26b that moves in association with the float portion 26a.

The engaging portion 26b is configured to engage with the lower rod 15b falling after being separated by the clutch mechanism 22 to prevent the lower rod 15b and the discharge valve 12 from falling to be seated on the discharge port 10a. Next, when the float portion 26a is moved down with the lowering of the water level in the reservoir tank 10 and the water level in the reservoir tank 10 is lowered to a predetermined water level, the float portion 26a turns the engaging portion 26b to release the engagement between the engaging portion 26b and the lower rod 15b. When the engagement is released, the lower rod 15b and the discharge valve 12 fall and are seated on the discharge port 10a. This enables the delay of closing of the discharge valve 12, so that an appropriate amount of flush water can be drained from the discharge port 10a.

The controller 28 incorporates a circuit board therein, and is configured to control the electromagnetic valve 20a for water discharge control, the electromagnetic valve 20b for water spout control, and the like in response to the operation of the lever handle 8. A microprocessor, a memory, an interface circuit, and the like are provided on the circuit board, and these are operated by software for controlling the toilet flush.

Figure 4:
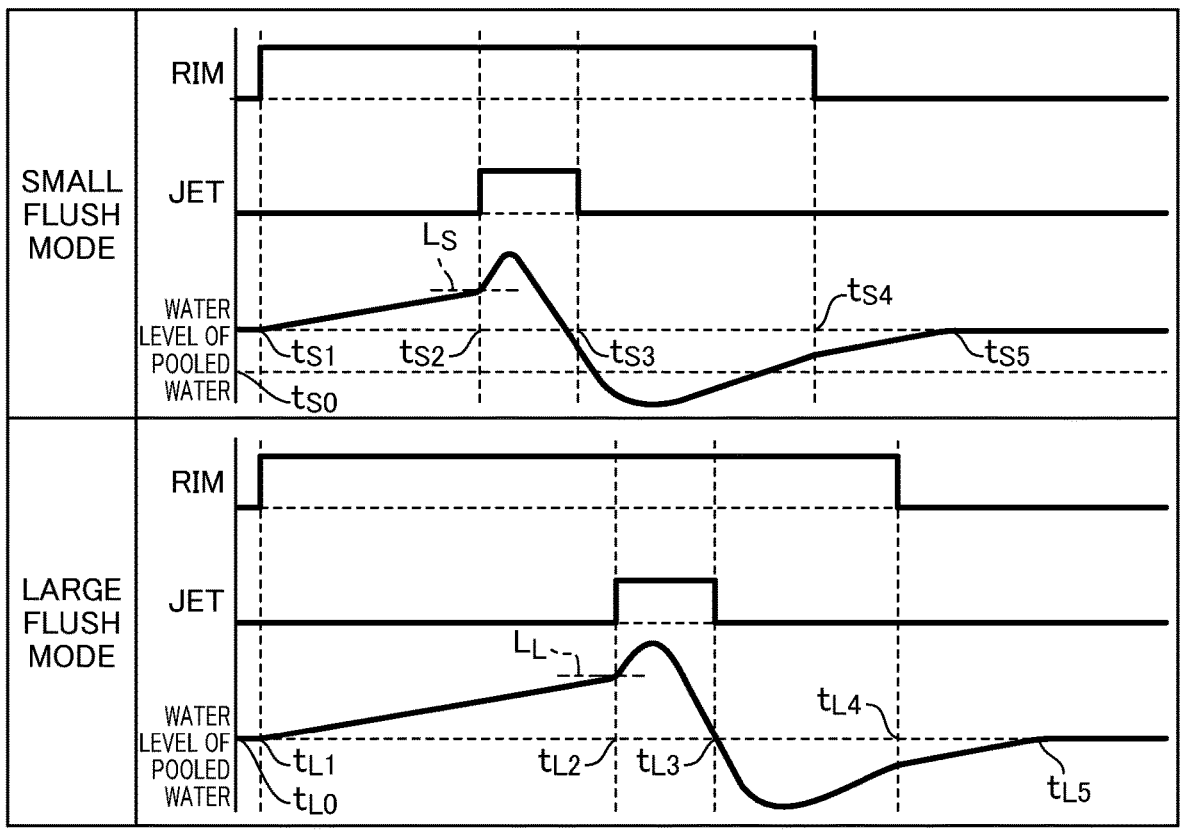
FIG. 4 is a time chart illustrating an example of toilet flush sequence by the flush toilet apparatus of the first embodiment of the present invention.
Figure 5:
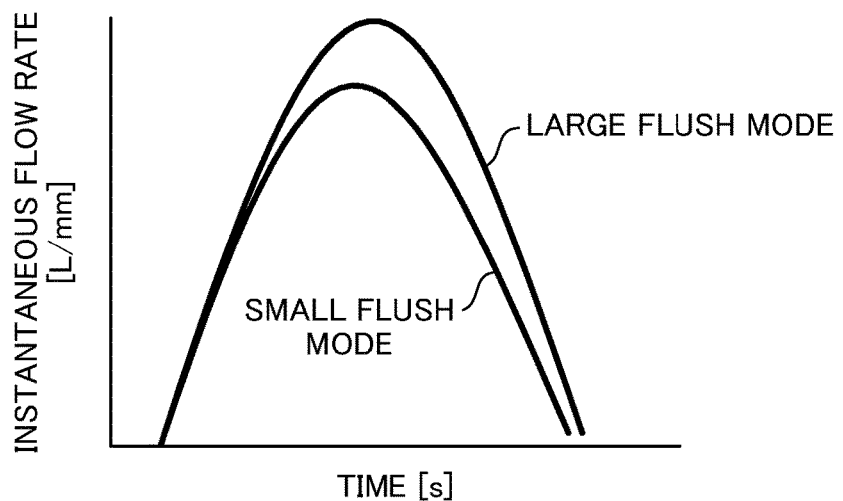
FIG. 5 is a diagram schematically illustrating temporal changes in instantaneous flow rate of flush water flowing through a water discharge trap pipe in a large flush mode and a small flush mode that are executed by the flush toilet apparatus of the first embodiment of the present invention.

Next, an operation of the flush toilet apparatus 1 according to the first embodiment of the present invention will be described with reference to FIGS. 4 and 5. FIG. 4 is a time chart illustrating an example of toilet flush sequence by the flush toilet apparatus of the first embodiment of the present invention, in which an upper row shows a toilet flush in the small flush mode, and a lower row shows a toilet flush in the large flush mode. In each row, an upper stage shows a flow rate of the water discharge from the rim spout port, a middle stage shows a flow rate of the water discharge from the jet spout port, and a lower stage shows a water level of the pooled water in the bowl. FIG. 5 is a diagram schematically illustrating temporal changes in instantaneous flow rate of the flush water flowing through the water discharge trap pipe in the large flush mode and the small flush mode.

First, a description will be made on the toilet flush sequence when the small flush mode is executed as shown in the upper row in FIG. 4. In the standby state of the toilet flush at time $t_{S0}$ in FIG. 4, a water level in the reservoir tank 10 is a stopped water level $L_1$, and no energization is performed to the electromagnetic valve 20a for water discharge control and the electromagnetic valve 20b for water spout control. In this state, all of the pilot valve port (not illustrated) to be opened and closed by the electromagnetic valve pilot valve 19c, the pilot valve port (not illustrated) to be opened and closed by the electromagnetic valve pilot valve 18c, and the pilot valve port (not illustrated) to be opened and closed by float pilot valve 18d are closed. This brings the main valve body 18b of the water discharge control valve 18 and the main valve body 19b of the water spout control valve 19 into a valve closed state.

Next, when the user operates the lever handle 8 at time $t_{S1}$ in FIG. 4 to execute the small flush, a signal instructing a toilet flush in the small flush mode is transmitted to the controller 28 (FIG. 3). When receiving the instruction signal for a toilet flush, the controller 28 performs the energization to the electromagnetic valve 20b for water spout control to open the electromagnetic valve pilot valve 19c of the water spout control valve 19. This causes the pressure inside the pressure chamber of the water spout control valve 19 to be decreased, whereby the main valve body 19b is detached from a valve seat and is opened. Note that in the present embodiment, since a bistable latching solenoid is used as the electromagnetic valve 20b for water spout control, once the electromagnetic valve pilot valve 19c is opened, the valve open state is maintained even when the energization is stopped.

When the water spout control valve 19 is opened, tap water supplied from the water supply pipe 32 to the water spout control valve 19 via the water supply pipe branching portion 33 and the first branched pipe 33a flows into the rim water supply pipe 25 through the water spout control valve 19. The flush water that has flowed into the rim water supply pipe 25 is discharged from the rim spout port 2d (FIG. 2) of the flush toilet main body.

The flush water that has been discharged from the rim spout port 2d flows downward while swirling in the bowl 2a and washes a waste receiving surface of the bowl 2a. The water discharge from the rim spout port 2d is performed as "pre-rim" water discharge to be performed before the water discharge from the jet spout port 2b is started. When the "pre-rim" water discharge is thus performed, the water level of the pooled water in the bowl 2a starts to rise from time $t_{S1}$ as shown in the lower stage of the upper row in FIG. 4.

At time $t_{S2}$ after an elapse of a predetermined time period from when the energization is performed to the electromagnetic valve 20b for water spout control, the controller 28 performs the energization to the electromagnetic valve 20a for water discharge control and detaches the electromagnetic valve pilot valve 18c from the pilot valve port (not illustrated). This causes the pressure inside the pressure chamber of the water discharge control valve 18 to be decreased, whereby the main valve body 18b is detached from a valve seat and is opened. That is, the controller 28 causes the water discharge control valve 18 to be opened while maintaining the valve open state of the water spout control valve 19 after the water spout control valve 19 is opened. Note that in the present embodiment, since a bistable latching solenoid is used as the electromagnetic valve 20a for water discharge control, once the electromagnetic valve pilot valve 18c is opened, the valve open state is maintained even when the energization is stopped.

As described above, the flush water that has flowed out of the water discharge control valve 18 flows into the cylinder 14a of the discharge valve hydraulic drive part 14 through the inflow pipe 23 and flows out of the outflow pipe 24. A part of the water that has flowed into the cylinder 14a from the inflow pipe 23 flows out of the gap 14d between the inner wall of the through hole 14f of the cylinder 14a and the rod 15, and then flows into the reservoir tank 10. On the other hand, a part of the flush water that has flowed out through the outflow pipe 24 flows into the overflow pipe 10b, and the remainder of the flush water flows into the reservoir tank 10. That is, a part of the flush water that has flowed out of the discharge valve hydraulic drive part 14 flows into the reservoir tank 10, and the remainder of the flush water that has flowed into the overflow pipe 10b bypasses the discharge valve 12 to flow into the flush toilet main body from the jet spout port 2b.

On the other hand, the flush water that has flowed from the inflow pipe 23 into the cylinder 14a of the discharge valve hydraulic drive part 14 pushes up the piston 14b. Hereby, the rod 15 connected to the piston 14b and the discharge valve 12 are also lifted up, whereby the discharge port 10a is opened. Hereby, the flush water stored in the reservoir tank 10 flows out through the discharge port 10a, and is discharged, as "jet spout water", from the jet spout port 2b (FIG. 2) provided in the lower portion of the bowl 2a. The flush water discharged from the jet spout port 2*b* fills the water discharge trap pipe 2*e* extending from the lower portion of the bowl 2*a* and induces a siphon phenomenon. Using the siphon phenomenon allows the pooled water and waste in the bowl 2*a* to be drained through the water discharge trap pipe 2*e*.

As shown in the lower stage of the upper row in FIG. 4, when the jet spout is started at time $t_{S2}$, the water level of the pooled water in the bowl 2*a* rises sharply. Next, when the siphon phenomenon occurs in the water discharge trap pipe 2*e*, the pooled water in the bowl 2*a* is drawn into the water discharge trap pipe 2*e* by the negative pressure and is drained through the water discharge trap pipe 2*e*, whereby the water level in the bowl 2*a* is lowered sharply. Note that, the water discharge from the rim spout port 2*d* is continued as "mid-rim" water discharge even while the flush water is being discharged from the jet spout port 2*b*.

On the other hand, when the piston 14*b* is pushed up in the discharge valve hydraulic drive part 14 and accordingly the rod 15 and the discharge valve 12 are lifted up to a predetermined position, the clutch mechanism 22 separates the lower rod 15*b* and the discharge valve 12 from the upper rod 15*a*. Hereby, during the opening of the water discharge control valve 18, the upper rod 15*a* remains pushed up upward together with the piston 14*b*, while the lower rod 15*b* and the discharge valve 12 fall by their own weight. However, the separated lower rod 15*b* engages with the engaging portion 26*b* of the discharge valve float mechanism 26, thereby stopping the fall of the lower rod 15*b* and the discharge valve 12. Hereby, the discharge port 10*a* of the reservoir tank 10 remains open even after the clutch mechanism 22 is disengaged, and the water discharge from the jet spout port 2*b* is continued.

As described above, a part of the flush water that has flowed out of the discharge valve hydraulic drive part 14 flows into the reservoir tank 10. However, since the flow rate of the flush water that flows into the reservoir tank 10 through the outflow pipe 24 is smaller than the flow rate of the flush water drained from the discharge port 10*a* by opening the discharge valve 12, the water level in the reservoir tank 10 is lowered in this state.

Next, when the flush water in the reservoir tank 10 is drained, the water level in the reservoir tank 10 is lowered, and therefore the control valve float 34 is lowered. Hereby, after the discharge valve 12 is opened at time $t_{S2}$, the arm portion 34*a* is turned, the float pilot valve 18*d* is detached from the pilot valve port (not illustrated), and the pilot valve port (not illustrated) is opened.

Furthermore, after the float pilot valve 18*d* is opened, the controller 28 transmits a control signal to the electromagnetic valve 20*a* for water discharge control again, to cause the electromagnetic valve pilot valve 18*c* to be closed. However, since the float pilot valve 18*d* is open at this time, the water discharge control valve 18 is maintained in the valve open state without causing an increase in the pressure inside the pressure chamber of the water discharge control valve 18.

Next, when the flush water in the reservoir tank 10 is drained from the discharge port 10*a* and the water level in the reservoir tank 10 is lowered to a predetermined water level, the float portion 26*a* of the discharge valve float mechanism 26 is lowered, which causes the engaging portion 26*b* to move. Hereby, the engagement between the lower rod 15*b* and the engaging portion 26*b* is released, and the lower rod 15*b* and the discharge valve 12 start to be lowered again. Then, at time $t_{S3}$, the discharge port 10*a* of the reservoir tank 10 is closed by the discharge valve 12, and the discharge of the flush water from the jet spout port 2*b* is stopped, the flush water having flowed out of the discharge port 10*a*. After the water discharge from the jet spout port 2*b* is stopped at time $t_{S3}$, the siphon phenomenon in the water discharge trap pipe 2*e* is terminated. The termination of the siphon phenomenon stops the drainage of the pooled water in the bowl 2*a* from the water discharge trap pipe 2*e*.

On the other hand, the water discharge from the rim spout port 2*d* is continued as "post-rim" water discharge to be performed even after the termination of the jet spout, and the flush water discharged from the rim spout port 2*d* flows into the bowl 2*a* and is used as refill water. Therefore, as shown in the lower stage of the upper row in FIG. 4, the water level of the pooled water in the bowl 2*a* rises gradually after the discharge valve 12 is closed and the siphon phenomenon is terminated.

Furthermore, at time $t_{S4}$ after an elapse of a predetermined time from when the water spout control valve 19 is opened at time $t_{S1}$, the controller 28 transmits a control signal to the electromagnetic valve 20*b* for water spout control to cause the electromagnetic valve pilot valve 19*c* to be closed. Hereby, the water spout control valve 19 is closed, and the discharge of the flush water from the rim spout port 2*d* is stopped.

Furthermore, since the water discharge control valve 18 is open even after the water discharge from the rim spout port 2*d* is stopped, the water supplied from the water supply pipe 32 flows into the reservoir tank 10 and the overflow pipe 10*b* through the cylinder 14*a* of the discharge valve hydraulic drive part 14. Accordingly, the flush water that has flowed into the overflow pipe 10*b* flows into the bowl 2*a* through the jet spout port 2*b* even after the discharge port 10*a* is closed, and the flush water that has flowed into the bowl 2*a* is used as refill water (note that the flush water discharged from the jet spout port 2*b* through the overflow pipe 10*b* is not shown in FIG. 4, because the flow rate is small). Hereby, the water level of the pooled water in the bowl 2*a* rises slowly even after the water discharge from the rim spout port 2*d* is stopped. On the other hand, the flush water that has flowed through the discharge valve hydraulic drive part 14 also flows into the reservoir tank 10, whereby the water level in the reservoir tank 10 also rises.

Next, at time $t_{S5}$, when the water level in the reservoir tank 10 rises to a predetermined stopped water level $L_1$, the control valve float 34 rises, and the float pilot valve 18*d* is moved via the arm portion 34*a*, whereby the pilot valve port is closed. Hereby, both of the electromagnetic valve pilot valve 18*c* and the float pilot valve 18*d* are closed, and therefore, the pressure inside the pressure chamber in the control valve main body 18*a* is increased to close the main valve body 18*b*, whereby the water discharge control valve 18 is brought into the valve closed state. At this time, the water level of the pooled water in the bowl 2*a* returns to the water level in the standby state (time $t_{S0}$). Accordingly, the water supply into the reservoir tank 10 is stopped.

On the other hand, when the water discharge control valve 18 is closed and the water supply to the discharge valve hydraulic drive part 14 is stopped, the piston 14*b* of the discharge valve hydraulic drive part 14 is pushed down by the urging force of the spring 14*c*. When the upper rod 15*a* is pushed down together with the piston 14*b*, the upper rod 15*a* and the lower rod 15*b* that have been separated from each other by the clutch mechanism 22 are connected again. Therefore, when next toilet flush is performed, the upper rod 15*a* and the lower rod 15*b* are lifted up together by the piston 14*b*. As described above, one toilet flush in the small flush mode is terminated, and the flush toilet apparatus returns to the standby state of the toilet flush.

Next, a description will be made on the toilet flush sequence when the large flush mode is executed as shown in the lower row in FIG. 4. The standby state of the toilet flush at time $t_{L0}$ in the lower row in FIG. 4 is similar to that in the small flush mode described above. Next, when the user operates the lever handle 8 at time $t_{L1}$ to execute the large flush, a signal instructing to execute the large flush mode is transmitted to the controller 28. The controller 28 performs the energization to the electromagnetic valve 20b for water spout control to open the water spout control valve 19 and starts the water discharge from the rim spout port 2d. The control of the water spout control valve 19 is similar to that in the small flush mode described above.

At time $t_{L2}$, the controller 28 performs the energization to the electromagnetic valve 20a for water discharge control to open the water discharge control valve 18. As described above, when the water discharge control valve 18 is opened, the discharge valve hydraulic drive part 14 is activated, and the discharge valve 12 of the reservoir tank 10 is opened. Hereby, at time $t_{L2}$, the water discharge from the jet spout port 2b is started. The function of opening the discharge valve 12 is also similar to that in the small flush mode described above. However, the time period from when the water discharge from the rim spout port 2d is started at time $t_{L1}$ to when the discharge valve 12 is opened at time $t_{L2}$ is set to be longer in the large flush mode than in the small flush mode. That is, the time period between time $t_{L1}$ and time $t_{L2}$ in the large flush mode is set to be longer than the time period between time $t_{S1}$ and time $t_{S2}$ in the small flush mode.

Here, even in the large flush mode, the flow rate (L/min) of the flush water discharged from the rim spout port 2d is the same as that in the small flush mode. However, the water discharge time period during which the water is discharged from the rim spout port 2d, before the water discharge from the jet spout port 2b is started is set to be longer in the large flush mode than in the small flush mode. Therefore, the water level of the pooled water in the bowl 2a when the water discharge from the jet spout port 2b is started is higher in the large flush mode than in the small flush mode. That is, the water level $L_L$ of the pooled water when the jet water discharge is started in the large flush mode is set to be higher than the water level $L_S$ of the pooled water when the jet water discharge is started in the small flush mode. Thus, in the present embodiment, the water level of the pooled water in the bowl 2a during the water discharge from the jet spout port 2b is controlled to be changed between the large flush mode and the small flush mode.

Thus, in the present embodiment, the time period during which the rim water discharge is performed, until the jet water discharge is started is set to be longer in the large flush mode than in the small flush mode, whereby the water level of the pooled water when the jet water discharge is started is set to be higher in the large flush mode than in the small flush mode. In contrast, as the modified example, the present invention can be also constituted so that the flow rate of the rim water discharge until the jet water discharge is started is set to be higher in the large flush mode than in the small flush mode, whereby the water level of the pooled water when the jet water discharge is started is set to be higher in the large flush mode than in the small flush mode.

Note that in the present embodiment, the flow rate (L/min) of the flush water discharged from the rim spout port 2d is relatively small. Therefore, the water is discharged from the jet spout port 2b in the state in which the siphon phenomenon has not yet occurred in the water discharge trap pipe 2e, and the siphon phenomenon is induced by the water discharge from the jet spout port 2b. That is, the water is discharged from the jet spout port 2b before the siphon phenomenon occurs in the water discharge trap pipe 2e.

When the flush water is discharged from the rim spout port 2d and the water level in the bowl 2a rises, the pooled water in the bowl 2a passes over a crest 2f of the water discharge trap pipe 2e and is discharged from the water discharge trap pipe 2e (in this state, the siphon phenomenon has not yet occurred). The flow rate of the flush rate when passing over the crest 2f of the water discharge trap pipe 2e increases gradually after the water discharge from the rim spout port 2d is started, and then the flow rate of the flush water flowing into the bowl 2a from the rim spout port 2d becomes equal to the flow rate of the flush water passing over the crest 2f of the water discharge trap pipe 2e and then flowing out of the water discharge trap pipe 2e. In this state, the water level of the pooled water in the bowl 2a is kept constant even during the water discharge from the rim spout port 2d and reaches a stable water level. In the present embodiment, the water discharge from the jet spout port 2b is started before the pooled water in the bowl 2a reaches the stable water level, so that the siphon phenomenon occurs in the water discharge trap pipe 2e.

Furthermore, a siphon force for draining the waste and pooled water in the bowl 2a via the water discharge trap pipe 2e increases as the water level of the pooled water in the bowl 2a at the time of the occurrence of the siphon phenomenon in the water discharge trap pipe 2e gets higher. That is, as the water level of the pooled water in the bowl 2a at the time of the occurrence of the siphon phenomenon is even higher than the height of the crest 2f (FIG. 2) of the water discharge trap pipe 2e, a head pressure is used to increase the force for pushing the pooled water into the water discharge trap pipe 2e, and the siphon force is increased. In addition, the amount of the flush water introduced into the water discharge trap pipe 2e is increased by the occurrence of the siphon phenomenon as the water level of the pooled water at the time of the occurrence of the siphon phenomenon gets higher, whereby the waste in the bowl 2a can be drained more strongly.

In the present embodiment, the water level of the pooled water when the water discharge from the jet spout port 2b is started to cause the siphon phenomenon to occur in the water discharge trap pipe 2e is set to be higher in the large flush mode than in the small flush mode. Therefore, as shown in FIG. 5, a maximum value of the instantaneous flow rate of the flush water flowing through the water discharge trap pipe 2e is larger in the large flush mode than in the small flush mode. As a result, in the present embodiment, the siphon force is larger in the large flush mode than in the small flush mode, whereby the waste and pooled water in the bowl 2a can be drained through the water discharge trap pipe 2e more strongly.

Furthermore, after the water discharge from the jet spout port 2b is started at time $t_{L2}$ in FIG. 4, the discharge valve 12 is closed at time $t_{L3}$, and the water discharge from the jet spout port 2b is terminated. Here, the jet water discharge from the jet spout port 2b is performed by opening the water discharge control valve 18 and activating the discharge valve hydraulic drive part 14 to lift up the discharge valve 12, and this applies to both cases of the large flush mode and the small flush mode. Accordingly, the time period from time $t_{L2}$ to time $t_{L3}$ during which the discharge valve 12 is open in the large flush mode is substantially the same as the time period from time $t_{S2}$ to time $t_{S3}$ during which the discharge valve 12 is open in the small flush mode. Therefore, the flush water is discharged from the jet spout port 2b with substantially the same amount (the same volume) in each of the large flush mode and the small flush mode to induce the siphon phenomenon in the water discharge trap pipe 2e.

Note that actually, the water supply pressure or the like of the water supplied from the waterworks C to the flush water tank device 4 is not always constant, and therefore the amount of the flush water discharge from the jet spout port 2b varies for each flush and in the large flush mode and the small flush mode. However, the water discharge from the jet spout port 2b is performed under the same control by the same flush control device (the discharge valve hydraulic drive part 14 and the controller 28), and therefore the flush water can be discharged from the jet spout port 2b with substantially the same amount in each of the large flush mode and the small flush mode. Accordingly, in the present embodiment, the large flush mode and the small flush mode are executed by changing the water level of the pooled water during the water discharge from the jet spout port 2b between the large flush mode and the small flush mode while discharging the flush water from the jet spout port 2b with substantially the same amount in each of the large flush mode and the small flush mode.

Next, at time $t_{L4}$ in FIG. 4, the controller 28 closes the water spout control valve 19 and terminates the water discharge from the rim spout port 2d. Furthermore, at time $t_{L5}$, when the water level in the reservoir tank 10 rises to a predetermined stopped water level $L_1$, the control valve float 34 rises, and the water discharge control valve 18 is brought into the valve closed state. At this time, the water level of the pooled water in the bowl 2a returns to the water level in the standby state (time $t_{L0}$), and the water supply to the reservoir tank 10 is stopped. As described above, one toilet flush in the large flush mode is terminated, and the flush toilet apparatus returns to the standby state of the toilet flush.

Here, the time period from when the discharge valve 12 is opened at time $t_{L2}$ until the water discharge from the rim spout port 2d is terminated at time $t_{L4}$ in the large flush mode is the same as the time period from time $t_{S2}$ to time $t_{S4}$ in the small flush mode. In addition, the time period from time $t_{L1}$ to time $t_{L4}$ during which the water is discharged from the rim spout port 2d in the large flush mode is longer than the time period from time $t_{S1}$ to time $t_{S4}$ during which the water is discharged from the rim spout port 2d in the small flush mode. Therefore, the amount of the flush water (the volume of the flush water) discharged from the rim spout port 2d is larger in the large flush mode than in the small flush mode. On the other hand, the time period from time $t_{L2}$ to time $t_{L5}$ during which the water discharge control valve 18 is open in the large flush mode is the same as the time period from time $t_{S2}$ to time $t_{S5}$ during which the water discharge control valve 18 is open in the small flush mode, and therefore, the amount of the flush water discharged from the jet spout port 2b with substantially the same amount in each of the large flush mode and the small flush mode. Therefore, the total amount of flush water (the volume of the total flush water discharged from the rim spout port 2d and the jet spout port 2b) used in the large flush mode is larger than the total amount of flush water used in the small flush mode.

According to the flush toilet apparatus 1 of the first embodiment of the present invention, the discharge valve hydraulic drive part 14 and the controller 28 which function as the flush control device cause the flush water to be discharged from the jet spout port 2b with substantially the same amount in each of the large flush mode and the small flush mode to induce the siphon phenomenon in the water discharge trap pipe 2e, which makes it possible to achieve the execution of the large flush mode and the small flush mode with a simple configuration. According to the present invention, the water discharge from the rim spout port 2d is controlled to change the water level of the pooled water in the bowl 2a during the water discharge from the jet spout port 2b between the large flush mode and the small flush mode, which makes it possible to achieve the execution of the large flush mode and the small flush mode while reducing waste water.

According to the flush toilet apparatus 1 of the present embodiment, the water level of the pooled water in the bowl 2a when the water discharge from the jet spout port 2b is started is set to be higher in the large flush mode than in the small flush mode. Therefore, in the large flush mode, the water discharge from the jet spout port 2b makes it possible to feed more flush water into the water discharge trap pipe 2e, to induce the high siphon phenomenon even when an amount of the water discharge from the jet spout port 2b to induce the siphon phenomenon is substantially the same as the amount in the small flush mode, and to increase the flush power.

According to the flush toilet apparatus 1 of the present embodiment, since the water discharge from the jet spout port 2b is started before the siphon phenomenon occurs in the water discharge trap pipe 2e, the water discharge from the jet spout port 2b can be used to induce the siphon phenomenon. Therefore, the large amount of flush water is discharged from the rim spout port 2d before the siphon phenomenon occurs, which makes it possible to reduce generation of waste water.

According to the flush toilet apparatus 1 of the present embodiment, the water discharge from the jet spout port 2b is started before the water level in the bowl 2a reaches the stable water level, which makes it possible to reduce the amount of the flush water drained from the bowl 2a without significantly contributing to the drainage of the waste and to reduce the waste water.

Furthermore, according to the flush toilet apparatus 1 of the present embodiment, the flush water is discharged from the jet spout port 2b with substantially the same amount in each of the large flush mode and the small flush mode, which makes it possible to simplify the mechanism for opening the discharge valve 12. On the other hand, the discharge timing, flow rate, and the like of the flush water supplied from the waterworks, which is a water supply source, can be changed relatively easily by the control of the water spout control valve 19, and the execution of the large flush mode and the small flush mode can be achieved easily.

Next, a flush toilet apparatus according to a second embodiment of the present invention will be described with reference to FIGS. 6 and 7. The flush toilet apparatus according to the present embodiment is different from that in the above-described first embodiment only in the control executed by a controller 28. Accordingly, hereinafter, only portions of the second embodiment of the present invention which are different from those of the first embodiment will be described, and the same configuration, functions, and effects as those in the first embodiment are not described.

Figure 6:
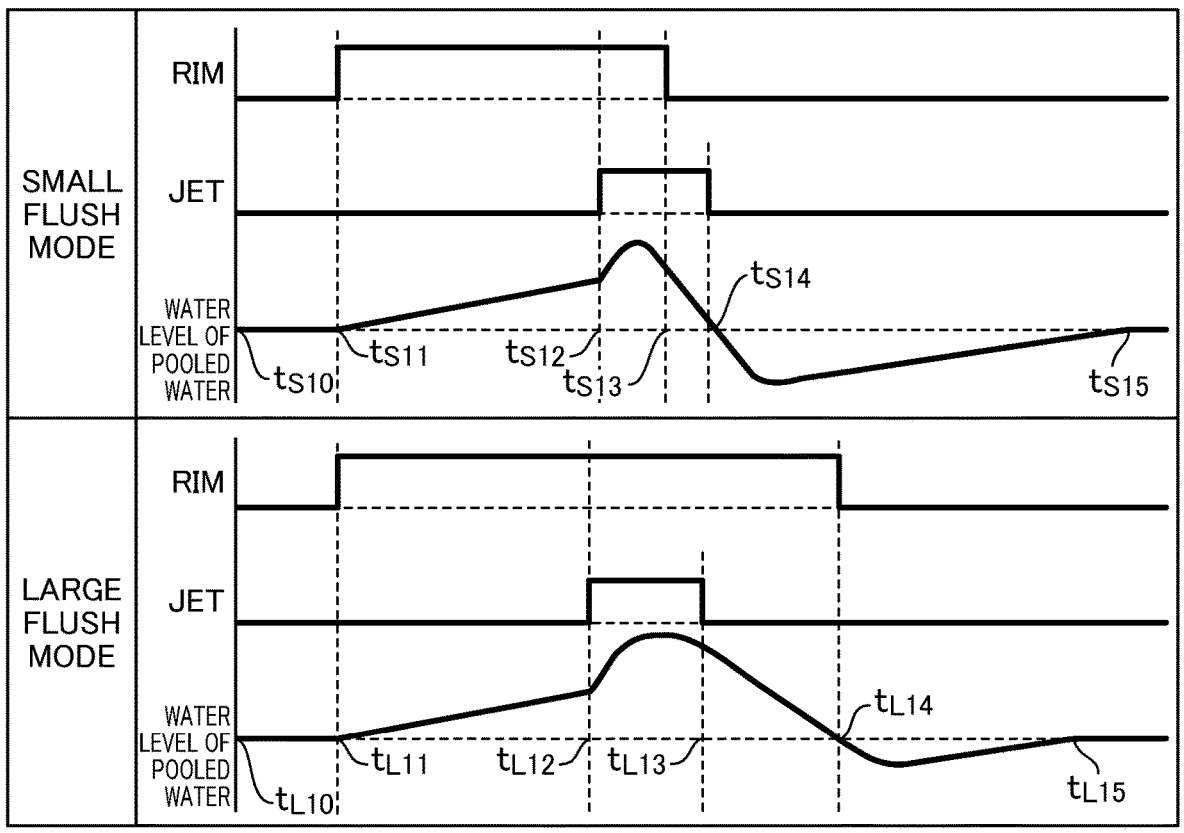
FIG. 6 is a time chart illustrating an example of toilet flush sequence by a flush toilet apparatus of a second embodiment of the present invention.

FIG. 6 is a time chart illustrating an example of toilet flush sequence by the flush toilet apparatus of the second embodiment of the present invention, in which an upper row shows a toilet flush in the small flush mode, and a lower row shows a toilet flush in the large flush mode. In each row, an upper stage shows a flow rate of the water discharge from the rim spout port, a middle stage shows a flow rate of the water discharge from the jet spout port, and a lower stage shows a water level of the pooled water in the bowl. FIG. 7 is a diagram schematically illustrating temporal changes in instantaneous flow rate of the flush water flowing through the water discharge trap pipe in the large flush mode and the small flush mode.

First, a description will be made on the toilet flush sequence when the small flush mode is executed as shown in the upper row in FIG. 6 by the flush toilet apparatus of the second embodiment of the present invention. The standby state of the toilet flush at time $t_{S10}$ in the upper row in FIG. 6 is similar to that in the first embodiment described above. Next, when the user operates lever handle 8 (FIG. 1) at time $t_{S11}$ to execute the small flush, a signal instructing to execute the small flush mode is transmitted to the controller 28. The controller 28 performs the energization to an electromagnetic valve 20b for water spout control to open a water spout control valve 19 and starts the water discharge from a rim spout port 2d. The control of the water spout control valve 19 is similar to that in the first embodiment described above. Hereby, the water level of the pooled water in a bowl 2a rises gradually.

Furthermore, at time $t_{S12}$, the controller 28 performs the energization to an electromagnetic valve 20a for water discharge control to open a water discharge control valve 18. When the water discharge control valve 18 is opened, a discharge valve hydraulic drive part 14 is activated, and a discharge valve 12 of a reservoir tank 10 is opened. Hereby, at time $t_{S12}$, the water discharge from a jet spout port 2b is started to induce a siphon phenomenon in a water discharge trap pipe 2e. The function of opening the discharge valve 12 is also similar to that in the first embodiment described above.

When the discharge valve 12 is opened and a large flow rate of water is discharged from the jet spout port 2b, the siphon phenomenon is induced in the water discharge trap pipe 2e, and the pooled water and waste in the bowl 2a are drained through the water discharge trap pipe 2e. Hereby, the water level of the pooled water in the bowl 2a is lowered.

Next, at time $t_{S13}$ before the discharge valve 12 is closed after the water discharge control valve 18 is opened and the discharge valve 12 is opened at time $t_{S12}$, the controller 28 stops the water discharge from the rim spout port 2d. That is, the controller 28 transmits a signal to the electromagnetic valve 20b for water spout control to close the water spout control valve 19 before the discharge valve 12 is closed after being opened and stops the water discharge from the rim spout port 2d.

Then, at time $t_{S14}$, the discharge valve 12 is seated on a discharge port 10a and is closed, and the water discharge from the jet spout port 2b for inducing the siphon phenomenon is terminated. The function of closing the discharge valve 12 is also similar to that in the first embodiment. Similarly, to the first embodiment described above, since the state in which the water discharge control valve 18 is open is continued even after the discharge valve 12 is closed, tap water supplied from a water supply pipe 32 (FIG. 3) flows into each of a reservoir tank 10 and an overflow pipe 10b through an outflow pipe 24.

Since the flush water that has flowed into the overflow pipe 10b flows into the bowl 2a through the jet spout port 2b to refill the bowl 2a, the water level of the pooled water in the bowl 2a rises even after the discharge valve 12 is closed. The flush water that has flowed into the reservoir tank 10 raises the water level in the reservoir tank 10. At time $t_{S15}$ in FIG. 6, when the water level in the reservoir tank 10 rises to a predetermined stopped water level $L_1$, a control valve float 34 rises, and the water discharge control valve 18 is brought into the valve closed state. At this time, the water level of the pooled water in the bowl 2a returns to the water level in the standby state (time $t_{S10}$), and the water supply to the reservoir tank 10 is stopped. As described above, one toilet flush in the small flush mode is terminated, and the flush toilet apparatus returns to the standby state of the toilet flush.

Next, a description will be made on the toilet flush sequence when the large flush mode is executed as shown in the lower row in FIG. 6. The standby state of the toilet flush at time $t_{L10}$ in the lower row in FIG. 6 is similar to that in the small flush mode. Next, when the user operates the lever handle 8 at time $t_{L11}$ to execute the large flush, a signal instructing to execute the large flush mode is transmitted to the controller 28. The controller 28 performs the energization to the electromagnetic valve 20b for water spout control to open the water spout control valve 19 and starts the water discharge from the rim spout port 2d. The control of the water spout control valve 19 is similar to that in the small flush mode. Hereby, the water level of the pooled water in the bowl 2a rises gradually.

Furthermore, at time $t_{L12}$, the controller 28 performs the energization to the electromagnetic valve 20a for water discharge control to open the water discharge control valve 18. When the water discharge control valve 18 is opened, the discharge valve hydraulic drive part 14 is activated, and the discharge valve 12 of the reservoir tank 10 is opened. Hereby, at time $t_{L12}$, the water discharge from the jet spout port 2b is started to induce a siphon effect. The function of opening the discharge valve 12 is also similar to that in the small flush mode. Also in the present embodiment, the siphon phenomenon does not occur in the water discharge trap pipe 2e before the water discharge from the jet spout port 2b is started.

When the discharge valve 12 is opened and a large flow rate of water is discharged from the jet spout port 2b, the siphon phenomenon is induced in the water discharge trap pipe 2e, and the pooled water and waste in the bowl 2a are drained through the water discharge trap pipe 2e. Here, in the present embodiment, the time period from time $t_{L11}$ when the rim water discharge is started to time $t_{L12}$ when the jet water discharge is started is the same as the time period from time $t_{S11}$ to time $t_{S12}$ in the small flush mode. Therefore, in the present embodiment, the water level of the pooled water in the bowl 2a at the time when the water discharge from the jet spout port 2b is started is controlled to be substantially the same in each of the large flush mode and the small flush mode.

On the other hand, in the small flush mode, the controller 28 stops the water discharge from the rim spout port 2d at time $t_{S13}$ before the discharge valve 12 is closed after the water discharge control valve 18 is opened and the discharge valve 12 is opened at time $t_{S12}$. In contrast, in the large flush mode, the water discharge from the rim spout port 2d is continued even after the discharge valve 12 is closed (after time $t_{L13}$). Therefore, in the small flush mode, after the water discharge from the jet spout port 2b is used to induce the siphon phenomenon in the water discharge trap pipe 2e, the water level of the pooled water in the bowl 2a is lowered sharply, whereas in the large flush mode, the water level of the pooled water is lowered slowly even after the siphon phenomenon is induced. As a result, in the large flush mode, the water level of the pooled water in the bowl 2a is always located at a position higher than an upper end 2g (FIG. 2) of an inlet of the water discharge trap pipe 2e, and therefore, air is not introduced from the inlet from the water discharge trap pipe 2e.

Figure 7:
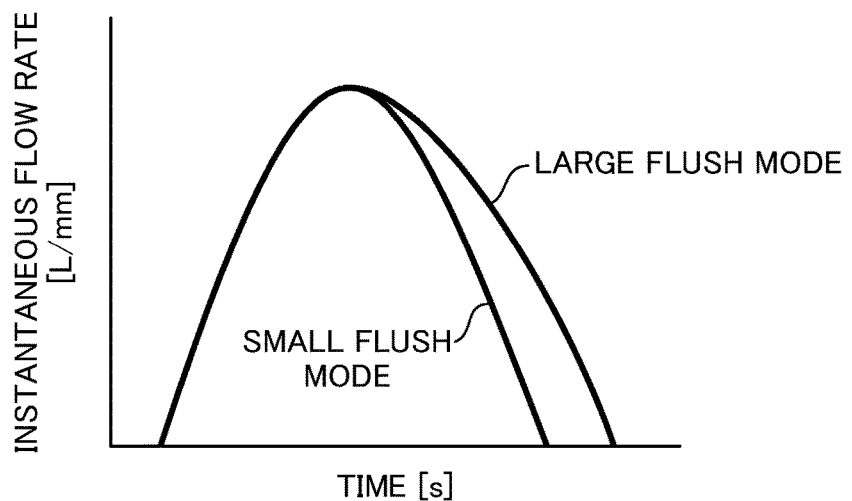
FIG. 7 is a diagram schematically illustrating temporal changes in instantaneous flow rate of flush water flowing through a water discharge trap pipe in a large flush mode and a small flush mode that are executed by the flush toilet apparatus of the second embodiment of the present invention.

That is, as schematically shown in FIG. 7, in the present embodiment, the water level in the bowl 2a at the time when the jet water discharge is started is the same in each of the large flush mode and the small flush mode, and therefore, a maximum value of the instantaneous flow rate of the flush water flowing through the water discharge trap pipe 2e is substantially the same in each of the large flush mode and the small flush mode. However, in the small flush mode, the rim water discharge is stopped during the jet water discharge (the time period from time $t_{S12}$ to time $t_{S14}$), whereas in the large flush mode, the rim water discharge is continued, and therefore, the water level of the pooled water after the siphon phenomenon is induced is maintained higher than in the small flush mode. As a result, the siphon phenomenon is continued in the water discharge trap pipe 2e for a long time.

Thus, in the present embodiment, the water discharge from the rim spout port 2d is controlled so that the water level of the pooled water in the bowl 2a during the water discharge from the jet spout port 2b is changed between the large flush mode and the small flush mode. That is, the water discharge from the rim spout port 2d is controlled so that the water level of the pooled water in the bowl 2a when the water discharge from the jet spout port 2b is started is higher in the large flush mode than in the small flush mode. Therefore, as shown in FIG. 7, the time period during which a large flow rate of flush water flows into the water discharge trap pipe 2e is longer in the large flush mode than in the small flush mode. Thus, the large flush mode can provide the stronger flush power than the small flush mode.

Thus, in the present embodiment, the time period during which the rim water discharge is performed during the jet water discharge is set to be shorter in the small flush mode than in the large flush mode, whereby the water level of the pooled water after the jet water discharge is started is set to be higher in the large flush mode than in the small flush mode. In contrast, as the modified example, the present invention can be also constituted so that the flow rate of the rim water discharge during the jet water discharge is set to be higher in the large flush mode than in the small flush mode, whereby the water level of the pooled water after the jet water discharge is started is set to be higher in the large flush mode than in the small flush mode. In the present embodiment, in the small flush mode, the rim water discharge is stopped during the jet water discharge, but the present invention can be also constituted so that the rim water discharge is gradually reduced during the jet water discharge.

Then, at time $t_{L13}$ in FIG. 6, the discharge valve 12 is seated on the discharge port 10a and is closed, and the water discharge from the jet spout port 2b for inducing the siphon phenomenon is terminated. Here, the time period from time $t_{L12}$ when the discharge valve 12 is opened to time $t_{L13}$ when the discharge valve 12 is closed in the large flush mode is substantially the same as the time period from time $t_{S12}$ when the discharge valve 12 is opened to time $t_{S14}$ when the discharge valve 12 is closed in the small flush mode. Therefore, the amount of the flush water (the volume of the flush water) discharged from the jet spout port 2b for inducing the siphon phenomenon in the water discharge trap pipe 2e is substantially the same in each of the small flush mode and the large flush mode.

Next, after the discharge valve 12 is closed, at time $t_{L14}$, the controller 28 closes the water spout control valve 19 to stop the water discharge from the rim spout port 2d. Thus, in the large flush mode, the water discharge from the rim spout port 2d is continued from before the water discharge from the jet spout port 2b for inducing the siphon phenomenon is started until the water discharge from the jet spout port 2b is terminated.

Furthermore, since the state in which the water discharge control valve 18 is open is continued even after the discharge valve 12 is closed, tap water supplied from the water supply pipe 32 (FIG. 3) flows into each of the reservoir tank 10 and the overflow pipe 10b through an outflow pipe 24. The flush water that has flowed into the reservoir tank 10 is stored in the reservoir tank 10, and the flush water that has flowed into the overflow pipe 10b flows into the bowl 2a through the jet spout port 2b to refill the bowl 2a.

Next, at time $t_{L15}$, when the water level in the reservoir tank 10 rises to a predetermined stopped water level $L_1$, the control valve float 34 rises, and the water discharge control valve 18 is brought into the valve closed state. At this time, the water level of the pooled water in the bowl 2a returns to the water level in the standby state (time $t_{L10}$), and the water supply to the reservoir tank 10 is stopped. As described above, one toilet flush in the large flush mode is terminated, and the flush toilet apparatus returns to the standby state of the toilet flush.

Here, the time period from time $t_{L11}$ to time $t_{L14}$ during which the water is discharged from the rim spout port 2d in the large flush mode is longer than the time period from time $t_{S11}$ to time $t_{S13}$ during which the water is discharged from the rim spout port 2d in the small flush mode. Therefore, the amount of the flush water (the volume of the flush water) discharged from the rim spout port 2d is larger in the large flush mode than in the small flush mode. Thus, the total amount of flush water (the volume of the total flush water discharged from the rim spout port 2d and the jet spout port 2b) used in the large flush mode is larger than the total amount of flush water used in the small flush mode.

According to the flush toilet apparatus of the second embodiment of the present embodiment, the water level of the pooled water in the bowl 2a after the water discharge from the jet spout port 2b is started is set to be higher in the large flush mode than in the small flush mode. As a result, in the large flush mode in which the water level of the pooled water is higher than in the small flush mode, the duration of the siphon phenomenon is longer than in the small flush mode. Therefore, the duration of the siphon phenomenon can be set to be longer in the large flush mode than in the small flush mode while the flush water is discharged from the jet spout port 2b with substantially the same amount in each of the large flush mode and the small flush mode to induce the siphon phenomenon, whereby the flush power can be increased.

According to the flush toilet apparatus of the second embodiment of the present invention, in the execution of the large flush mode, the water discharge from the rim spout port 2d is continued from before the water discharge for inducing the siphon phenomenon is started until the water discharge is terminated. Therefore, the water discharge from the rim spout port 2d can be used to wash the surface of the bowl 2a, assist the siphon effect induced by the water discharge from the rim spout port 2d, and refill the bowl 2a, whereby the water discharge from the rim spout port 2d can be effectively utilized for the flush.

Next, a flush toilet apparatus according to a third embodiment of the present invention will be described with reference to FIG. 8. In the flush toilet apparatus according to the present embodiment, the flush sequence in each of the large flush mode and the small flush mode is the same as the first embodiment described above, but a configuration of the flush toilet apparatus to achieve the flush sequence is different from that in the first embodiment described above. Accordingly, hereinafter, only portions of the third embodiment of the present invention which are different from those of the first embodiment will be described, and the same configuration, functions, and effects as those in the first embodiment are not described. FIG. 8 is a diagram illustrating an entire configuration of the flush toilet apparatus according to the third embodiment of the present invention.

As illustrated in FIG. 8, a flush toilet apparatus 100 of the present embodiment includes a flush toilet main body 102, a flush water tank device 104, and a flush control device 106 configured to control a flush on the flush toilet main body 102. The flush toilet apparatus 100 of the present embodiment is configured to use the flush control device 106 to be capable of executing a large flush or a small flush on a bowl 102a of the flush toilet main body 102 in response to operation of a remote controller 108 after use of the flush toilet apparatus 100.

Furthermore, the flush water tank device 104 includes a reservoir tank 110 which is a flush water tank main body configured to store flush water to be supplied to the flush toilet main body 102, a pressurizing pump 112 configured to pressure-feed the flush water stored in the reservoir tank 110 to the flush toilet main body 102, a switching valve 114, and an on-off valve 116 configured to switch the supply and stop of flush water to the switching valve 114, the flush water being supplied from a waterworks C, which is a water supply source.

The flush toilet main body 102 includes a bowl 102a configured to receive waste, a jet spout port 102b, which is a lower water discharge port provided below a pooled water surface W of the bowl 102a, and a rim spout port 102d, which is an upper water discharge port provided in a rim 102c of the bowl 102a. Furthermore, a water discharge trap pipe 102e communicates with a lower portion of the bowl 102a, and an inlet of the water discharge trap pipe 102e is directed to face the jet spout port 102b.

The pressurizing pump 112 is configured to pressurize the flush water stored in the reservoir tank 110 to discharge the flush water from the jet spout port 102b of the flush toilet main body 102. The pressurizing pump 112 is activated and the flush water is discharged from the jet spout port 102b, whereby a siphon phenomenon is induced in the water discharge trap pipe 102e.

The switching valve 114 is configured to switch the flush water supplied from the waterworks C to the reservoir tank 110 side or the rim spout port 102d side. In a state in which the switching valve 114 is switched to the reservoir tank 110 side, the flush water that has been supplied from the waterworks C and has passed through the switching valve 114 flows into the reservoir tank 110 and is stored in the reservoir tank 110. On the other hand, in a state in which the switching valve 114 is switched to the rim spout port 102d side, the flush water that has been supplied from the waterworks C and has passed through the switching valve 114 flows out of the rim spout port 102d of the flush toilet main body 102.

The on-off valve 116 is provided on the upstream side of the switching valve 114, and is configured to be capable of switching flowing out and stop of the flush water to the switching valve 114, the flush water being supplied from the waterworks C. In a state in which the switching valve 114 is switched to the rim spout port 102d side, the water discharge or water stop of the flush water from the rim spout port 102d is switched by opening and closing the on-off valve 116.

The flush control device 106 is configured to execute a small flush mode and a large flush mode in response to the operation of the remote controller 108. That is, the flush control device 106 transmits a control signal to each of the pressurizing pump 112, the switching valve 114, and the on-off valve 116 to execute the small flush mode and the large flush mode. Specifically, the flush control device 106 includes a microprocessor, a memory, an interface circuit, and software for operating these components (not illustrated), and the like.

Next, an operation of the flush toilet apparatus 100 according to the third embodiment of the present invention will be described. The toilet flush sequence executed by the flush toilet apparatus 100 of the present embodiment is similar to the sequence in the first embodiment shown in FIG. 4.

That is, in the standby state at time $t_{S0}$ in the upper row in FIG. 4, the flush water is stored to a predetermined water level in the reservoir tank 110, the switching valve 114 is switched to the rim spout port 102d side, and the on-off valve 116 is closed. Next, when the user performs a small flush operation using the remote controller 108 at time $t_{S1}$, the flush control device 106 executes the small flush mode. First, the flush control device 106 transmits a control signal to the on-off valve 116, and the on-off valve 116 is opened. Thus, the flush water supplied from the waterworks C is discharged, as "pre-rim" water discharge, from the rim spout port 102d of the flush toilet main body 102 through the on-off valve 116 and the switching valve 114. That is, the rim water discharge from the rim spout port 102d is directly executed by the water supply pressure of the waterworks C.

Next, at time $t_{S2}$, the flush control device 106 transmits a control signal to the pressurizing pump 112 to operate the pressurizing pump 112. Thus, the flush water stored in the reservoir tank 110 is pressure-fed and is discharged from the jet spout port 102b of the flush toilet main body 102. In this way, the siphon phenomenon is induced in the water discharge trap pipe 102e, and the waste and pooled water in the bowl 102a are drained through the water discharge trap pipe 2e. Note that, the water discharge from the rim spout port 102d is continued as "mid-rim" water discharge even after the jet water discharge is started at time $t_{S2}$.

Furthermore, at time $t_{S3}$, the flush control device 106 transmits a control signal to the pressurizing pump 112 to stop the pressurizing pump 112. Hereby, the jet water discharge from the jet spout port 102b is stopped. In addition, the water discharge from the rim spout port 102d is continued, as "post-rim" water discharge, even after the jet water discharge is stopped at time $t_{S3}$. The flush water discharged as the "post-rim" water discharge is used to refill the bowl 102a of the flush toilet main body 102.

Next, when the refilling of the bowl 102a is completed at time $t_{S4}$, the flush control device 106 transmits a control signal to the switching valve 114 to switch the switching valve 114 to the reservoir tank 110 side. Hereby, the flush water supplied from the waterworks C is supplied to the reservoir tank 110, and the water discharge from the rim spout port 102d is stopped. Then, when the water level in the reservoir tank 110 returns to a predetermined water level, the flush control device 106 closes the on-off valve 116 and switches the switching valve 114 to the rim spout port 102d side. Hereby, the flush toilet apparatus 100 returns to the standby state before the toilet flush start and completes the toilet flush in the small flush mode.

The large flush mode shown in the lower row in FIG. 4 is also executed under the control of the flush control device 106 similarly to the small flush mode. Here, the time period from when the rim water discharge is started at time $t_{L1}$ to when the pressurizing pump 112 is activated at time $t_{L2}$ is set to be longer in the large flush mode than in the small flush mode. Therefore, the water level of the pooled water in the bowl 102a when the pressurizing pump 112 is activated at time $t_{L2}$ to start the water discharge from the jet spout port 102b is higher in the large flush mode than in the small flush mode.

Furthermore, at times $t_{L2}$ to $t_{L3}$, the pressurizing pump 112 is activated at the same actuation time and the same actuation rotation rate as the times $t_{S2}$ to $t_{S3}$ in the small flush mode. Therefore, the amount of the flush water discharged from the jet spout port 102b for inducing the siphon phenomenon in the water discharge trap pipe 102e is substantially the same in each of the large flush mode and the small flush mode. In this way, also in the flush toilet apparatus 100 of the present embodiment using the reservoir tank 110 and the pressurizing pump 112, the large flush mode and the small flush mode similar to those in the first embodiment of the present invention can be executed.

By changing timing of actuating the pressurizing pump 112, the switching valve 114, and the on-off valve 116, a configuration of the flush toilet apparatus 100 of the present embodiment also makes it possible to execute the large flush mode and the small flush mode similar to those in the second embodiment of the present invention shown in FIG. 6.

The embodiments of the present invention have been described above, but various changes may be added to the above-described embodiments. In particular, in the above-described embodiments, the water discharge from the rim spout port is directly supplied from the waterworks and the water discharge from the jet spout port is supplied from the reservoir tank, but these water discharge supply sources may be combined arbitrarily. Furthermore, in the above-described embodiments, the rim spout port serving as the upper water discharge port is provided above the pooled water surface, and the jet spout port serving as the lower water discharge port is provided below the pooled water surface, but positions of these spout ports may be appropriately changed above and below the pooled water surface. The present invention can be constituted by optionally combining the above-described optional structural elements included in each embodiment of the present invention with configurations of the other embodiments.

REFERENCE SIGNS LIST

1 Flush toilet apparatus
2 Flush toilet main body
2a Bowl
2b Jet spout port (lower water discharge port)
2c Rim
2d Rim spout port (upper water discharge port)
2e Water discharge trap pipe
2f Crest of water discharge trap pipe
2g Upper end of inlet
4 Flush water tank device
8 Lever handle
10 Reservoir tank (flush water tank main body)
10a Discharge port
10b Overflow pipe
12 Discharge valve
14 Discharge valve hydraulic drive part
14a Cylinder
14b Piston
14c Spring
14d Gap
14e Packing
14f Through hole
15 Rod
15a Upper rod
15b Lower rod
18 Water discharge control valve
18a Control valve main body
18b Main valve body
18c Electromagnetic valve pilot valve
18d Float pilot valve
19 Water spout control valve (on-off valve)
19a Water spout valve main body
19b Main valve body
19c Electromagnetic valve pilot valve
20a Electromagnetic valve for water discharge control
20b Electromagnetic valve for water spout control
22 Clutch mechanism
23 Inflow pipe
24 Outflow pipe
24b First descending pipe
24c Second descending pipe
25 Rim water supply pipe
26 Discharge valve float mechanism
26a Float portion
26b Engaging portion
28 Controller
30a Vacuum breaker
30b Vacuum breaker
32 Water supply pipe
32a Stop cock
32b Fixed flow valve
33 Water supply pipe branching portion
33a First branched pipe
33b Second branched pipe
34 Control valve float
100 Flush toilet apparatus
102 Flush toilet main body
102a Bowl
102b Jet spout port
102c Rim
102d Rim spout port
102e Water discharge trap pipe
104 Flush water tank device
106 Flush control device
108 Remote controller
110 Reservoir tank
112 Pressurizing pump
114 Switching valve
116 On-off valve

What is claimed is:

1. A flush toilet apparatus capable of executing a large flush mode and a small flush mode, the flush toilet apparatus comprising:
a flush toilet main body that includes a bowl, a water discharge trap pipe communicating with a lower portion of the bowl, an upper water discharge port provided above a pooled water surface of the bowl, and a lower water discharge port provided below the pooled water surface; and
a flush control device configured to control water discharge of flush water from the upper water discharge port and the lower water discharge port to execute the large flush mode and the small flush mode in which a flush water amount is smaller than the flush water amount in the large flush mode,
wherein the flush control device causes the flush water to be discharged from the lower water discharge port with substantially the same amount in each of the large flush mode and the small flush mode to induce a siphon phenomenon in the water discharge trap pipe, while controlling the water discharge from the upper water discharge port so that a water level of pooled water in the bowl during the water discharge from the lower water discharge port is different between the large flush mode and the small flush mode.

2. The flush toilet apparatus according to claim 1, wherein the flush control device increases a flow rate or time of the water discharge from the upper water discharge port until the water discharge from the lower water discharge port is started in execution of the large flush mode more than in the execution of the small flush mode, whereby the water level of the pooled water in the bowl when the water discharge from the lower water discharge port is started is set to be higher in the large flush mode than in the small flush mode.

3. The flush toilet apparatus according to claim 1, wherein the flush control device causes the water discharge from the lower water discharge port to be started before the siphon phenomenon occurs in the water discharge trap pipe.

4. The flush toilet apparatus according to claim 1, wherein the flush control device causes the water discharge from the lower water discharge port to be started before the water level of the pooled water in the bowl reaches a stable water level at which a flow rate of the flush water flowing out over the water discharge trap pipe is equal to a flow rate of the flush water flowing into the bowl from the upper water discharge port.

5. The flush toilet apparatus according to claim 1, wherein the flush control device increases a flow rate or time of the water discharge from the upper water discharge port after the water discharge from the lower water discharge port is started in execution of the large flush mode more than in the execution of the small flush mode, whereby the water level of the pooled water in the bowl after the water discharge from the lower water discharge port is started is set to be higher in the large flush mode than in the small flush mode.

6. The flush toilet apparatus according to claim 5, wherein the flush control device controls the water discharge from the upper water discharge port so that at least in the execution of the large flush mode, the water level of the pooled water in the bowl is higher than an upper end of an inlet of the water discharge trap pipe before the water discharge from the lower water discharge port is started.

7. The flush toilet apparatus according to claim 5, wherein the flush control device causes the water discharge from the upper water discharge port to be continued from before the water discharge from the lower water discharge port for inducing the siphon phenomenon is started until the water discharge from the lower water discharge port is terminated, in the execution of the large flush mode.

8. The flush toilet apparatus according to claim 1, wherein the flush toilet apparatus further includes a flush water tank main body configured to store flush water, a discharge valve configured to switch drainage and stop of the flush water in the flush water tank main body, and an on-off valve configured to switch discharge and stop of flush water supplied from a water supply source, and the flush control device causes the flush water to be discharged from the lower water discharge port by opening the discharge valve, and causes the flush water to be discharged from the upper water discharge port by opening the on-off valve.

* * * * *